United States Patent
Schüttpelz et al.

(10) Patent No.: US 10,324,194 B2
(45) Date of Patent: Jun. 18, 2019

(54) METHOD FOR OPERATING A GNSS RECEIVER, WITH GNSS SIGNAL DESELECTION

(71) Applicant: Thales Management & Services Deutschland GmbH, Ditzingen (DE)

(72) Inventors: André Schüttpelz, Sachsenheim (DE); Ulrich Kälberer, Stuttgart (DE)

(73) Assignee: THALES MANAGEMENT & SERVICES DEUTSCHLAND GMBH, Ditzingen (DE)

( * ) Notice: Subject to any disclaimer, the term of this patent is extended or adjusted under 35 U.S.C. 154(b) by 0 days.

(21) Appl. No.: 16/051,705

(22) Filed: Aug. 1, 2018

(65) Prior Publication Data
US 2019/0041528 A1 Feb. 7, 2019

(30) Foreign Application Priority Data
Aug. 2, 2017 (EP) .................................... 17184536

(51) Int. Cl.
G01S 19/00 (2010.01)
G01S 19/23 (2010.01)
(Continued)

(52) U.S. Cl.
CPC ............ *G01S 19/235* (2013.01); *G06F 17/18* (2013.01); *H04L 27/2278* (2013.01)

(58) Field of Classification Search
CPC ..... G01S 19/235; G06F 17/18; H04L 27/2278
See application file for complete search history.

(56) References Cited

U.S. PATENT DOCUMENTS 7,298,324 B2    11/2007   Manz
2006/0140254 A1   6/2006   Pietila et al.
(Continued)

FOREIGN PATENT DOCUMENTS

EP   2 793 050 B1   2/2017

OTHER PUBLICATIONS

Jyh-Ching Juang, "Multi-objective approach in GNSS code discriminator design", IEEE Transactions on Aerospace and Electronic Systems; vol. 44, No. 2; Apr. 1, 2008; pp. 481-492; IEEE Service Center, Piscataway, New Jersey, US.
(Continued)

*Primary Examiner* — Khai M Nguyen
(74) *Attorney, Agent, or Firm* — Hackler Daghighian Martino & Novak

(57) ABSTRACT

A Global Navigation Satellite System receiver for position determination receives from a multitude of satellites a respective GNSS code signal, which are correlated with a reference code signal to obtain an autocorrelation function. A multitude of function values of the autocorrelation function at different discrete chip spacings (chosen asymmetrically with respect to a prompt chip spacing) are analyzed and used in obtaining a test metric. Using the test metric, a decision is made whether the received GNSS code signal is suitable or unsuitable (thereafter excluded) for a position determination due to multipath signal components. A bias removal is performed taking into account corresponding function values of an autocorrelation function that would result from a received GNSS code signal of the satellite unaffected by multipath signal components. This provides a simple method for operating a GNSS receiver minimizing errors in position determination caused by multipath signal components.

17 Claims, 15 Drawing Sheets

(51) Int. Cl.
*G06F 17/18* (2006.01)
*H04L 27/227* (2006.01)

(56) References Cited

U.S. PATENT DOCUMENTS

2012/0182180 A1* 7/2012 Wolf ................. G01S 5/021
  342/357.29
2015/0085899 A1* 3/2015 Raghupathy ............ G01S 19/11
  375/142
2018/0329072 A1* 11/2018 Anderson ............. G01S 19/243

OTHER PUBLICATIONS

Jiyun Lee, et al., "LAAS Sigma-Mean Monitor Analysis and Failure-Test Verification," 11 pages, Stanford University, Stanford, California, US.

Alessandro Neri, et al., "A method for multipath detection and mitigation in railway control applications," 29th International Technical Meeting of the Satellite Division of the Institute of Navigation, Sep. 12-16, 2016, vol. 1 of 5, Portland, Oregon, US.

* cited by examiner

METHOD FOR OPERATING A GNSS RECEIVER, WITH GNSS SIGNAL DESELECTION

CROSS-REFERENCE TO RELATED APPLICATIONS

This application claims priority to European Patent Application No. EP 17 184 536.5, filed Aug. 2, 2017, the entire contents of which are hereby incorporated by reference.

DESCRIPTION

Field of the Invention

The invention relates to a method for operating a GNSS (=Global navigation satellite system) receiver, wherein for a position determination, the GNSS receiver receives from a multitude of satellites a respective GNSS code signal, and wherein for each signal from a satellite, the received GNSS code signal is correlated with a reference code signal generated by the GNSS receiver to obtain an autocorrelation function, wherein a multitude of function values of the autocorrelation function at different discrete chip spacings are analyzed and used in obtaining a test metric.

Background of the Invention

Such a method is known from EP 2 793 050 B1.

GNSS (=Global navigation satellite system) receivers are used to determine the position of, for example, moving vehicles such as a plane or a ship. A number of satellites orbiting in space regularly send out GNSS code signals, which are correlated with reference signals (also called replica signals) in order to determine a time delay between the transmission and the arrival at the GNSS receiver. These time delays may be used to determine distances to the respective satellites, which move on known trajectories, so position information (such as geographical longitude, latitude and height) can be calculated.

Ideally, the only signal path of GNSS code signals is directly from the satellite to the GNSS receiver. However, in practice, the same GNSS signal from a satellite may arrive multiple times at the GNSS receiver, since signal reflections may occur, for example, at buildings or on the ground. Indirect signal paths are longer than the direct signal path. At the receiver, a superposition of the direct signal and indirect signals is obtained, what makes determination of the time delay of the direct signal more difficult.

In order to determine the time delay of the received (superposition) GNSS code signal and a reference signal, an autocorrelation function is calculated for different chip spacings (time shifts). If the direct signal is by far the strongest signal, then the chip spacing of the maximum of the autocorrelation function may be taken as the prompt (undelayed) chip spacing. However, multipath signal components (from indirect signals) may shift the maximum of the autocorrelation function with respect to the "true" prompt chip spacing, which can result in errors in position determination.

EP 2 793 050 B1 proposes in a GNSS signal processing method to obtain autocorrelation values for a first and a second early replica signal, and a first and second late replica signal, and to calculate an early late differential value $\Delta CV_{EL}$ from a first late correlation value $CV_L$ and a first early correlation value $CV_E$. Further, an early differential signal $\Delta CV_E$ and a late differential signal $\Delta CV_L$ are calculated. Then an error detection value is calculated using $\Delta CV_{EL}$ and either $\Delta CV_L$ and $\Delta CV_E$. Depending on the comparison of $\Delta CV_{EL}$, $\Delta CV_L$ and $\Delta CV_E$ with some thresholds, different methods for calculating the error detection value are applied. The error detection value is used for controlling a code phase of the prompt replica signal.

Accordingly, the procedure of EP 2 793 050 B1 intends to increase the reliability of determining the "true" prompt replica signal when considerable multipath signal components are present in a received GNSS code signal.

In case of aeronautical GBAS application, it has been proposed to account for local effects by sigma-mean monitoring based on the determination of the sample variance and mean estimations of PRC (=pseudo-range correction) quality indicators (B-values). This process takes a long time in order to collect enough samples to build the statistical estimations. This can be supported by integrating/CUSUM (=cumulative sum) methods, but still is a quite slow process (compare ref. "LAAS Sigma-Mean Monitor Analysis and Failure-Test Verification". Jiyun Lee, Sam Pullen, Gang Xie, and Per Enge. Stanford University, IEEE Transactions on Aerospace and Electronic Systems, April 2006, Volume: 42, Issue: 2).

In train VB (=virtual balise) positioning applications, a double differencing of code phase for two GPS receivers and two satellites were proposed (compare ref. A. Neri, P. Enge et al., A METHOD FOR MULTIPATH DETECTION AND MITIGATION IN RAILWAY CONTROL APPLICATIONS, Proceedings of the 29th International Technical Meeting of the ION Satellite, Division, ION GNSS+2016, Portland, Oreg., Sep. 12-16, 2016). The algorithm can detect NLOS (=non-line of sight) multipath, however only multipath differences between the two receivers are detected. Correlated multipath will not be detected.

It is the object of present invention to provide a simple method for operating a GNSS receiver, which minimizes errors in position determination caused by multipath signal components.

SUMMARY OF THE INVENTION

This object is achieved, in accordance with the invention, by a method as introduced in the beginning, characterized in that using the test metric, a decision is made whether the received GNSS code signal is suitable for a position determination or unsuitable for a position determination due to multipath signal components, that a position determination of the GNSS receiver is made based on the received GNSS code signals from the multitude of satellites, with received GNSS code signals considered unsuitable for position determination being excluded from the position determination, that the chip spacings of the multitude of function values of the autocorrelation function are chosen asymmetrically with respect to a prompt chip spacing, that during analysis of the multitude of function values of the autocorrelation function, a bias removal is performed, taking into account corresponding function values of an autocorrelation function that would result from a received GNSS code signal of the satellite unaffected by multipath signal components, and that the multitude of function values contribute to the test metric in an order higher than first order.

According to the present invention, GNSS code signals which are affected by too much multipath signal components are excluded from positon determination. By this means, errors in position determination are significantly reduced. In general, a GNSS receiver has contact to more satellites than necessary for position determination. In general, four satellites are necessary for position determination (three for three space coordinates, and one for clock synchronization), but typically six or more, and often eight or more satellites have contact to the receiver. Therefore, exclusion of a few GNSS code signals from the available satellites will, most often, not hinder the position determination. On the other hand, including a GNSS code signal with significant multipath signal components may severely distort the position determination.

In order to decide whether a GNSS signal may be used for position determination or not, a test metric (or "monitor") is obtained (or calculated), which is based on function values of the autocorrelation function. The test metric basically measures deviations of the autocorrelation function by means of the function values at the chosen ship spacings as compared to an autocorrelation function free from multipath errors. In order to increase the informative value of the test metric, the invention applies the following:

The function values are chosen asymmetrically with respect to the prompt chip spacing. The inventors found that this leads to a more reliable multipath signal component detection. Typically, the chosen asymmetry applies both to the number of functional values on both sides of the prompt chip spacing, and the chip spacing intervals covered on both sides of the prompt chip spacing. Note that the prompt chip spacing can be assumed to be at the maximum of the autocorrelation function for this purpose; its location is typically determined with an early minus late discriminator whose S-curve zero-crossing may be used for determining the prompt chip spacing. In practice, multipath signal components lead to asymmetric distortions of the autocorrelation function; this behavior can be best captured and investigated with asymmetrically chosen functional values. Note that the autocorrelation function is typically obtained (calculated) only for a limited number of discrete chip spacings (chip positions).

Further, a bias removal is performed on the function values, taking into account (i.e. typically subtracting) corresponding values of an autocorrelation function that would result from an undistorted ("direct only") GNSS code signal. This reduces or avoids contributions to the test metric resulting from the asymmetric choice of functional values as such, and may reduce noise in the test metric significantly. Typically, a removal of a "nominal bias" is done. The nominal bias corresponds to a deviation of a real autocorrelation function for a received GNSS signal unaffected by multipath signal components, as compared to an ideal (triangular) autocorrelation function. The nominal bias is typically composed of receiver inherent correlator properties and hardware delays, as well as a satellite specific component. It is in general constant over longer periods of time and can be either configured as calibration value or automatically determined from periods of fault free operation. The nominal bias may disguise (i.e. impede detection of) the multipath signal components, and taking it into account (in particular by subtracting it) in turn facilitates detection of multipath signal components accordingly. It should be noted that it is also possible to use a real autocorrelation function for a received GNSS signal unaffected by multipath signal components directly as a bias to be subtracted from the autocorrelation function obtained with the received GNSS code signal (possibly) containing multipath signal components. Typically a normalization is done in this step, too. In general, the autocorrelation function that would result from a received GNSS code signal of the satellite unaffected by multipath signal components is experimentally recorded or simulated in advance.

Finally, the multitude of values contributes to the test metric in an order higher than the first order. The test metric (or monitor) as a function of the amount of "error" contained becomes much steeper as compared to a linear metric. This makes multipath signal components much easier to detect and to quantify, and wrong detection of multipath signal components much less likely.

The GNSS code signal is typically a diffusion code (which is individually set for each satellite) and code modulated onto a carrier wave having a predetermined frequency.

The position determination in accordance with the invention may comprise the determination of space coordinates, in particular three space coordinates (such as geographical longitude, geographical latitude and height above a reference ellipsoid) of the GNSS receiver from the suitable GNSS code signals, or may comprise the determination of correction data (such as clock error or differential range errors), which contains a position information about the GNSS receiver obtained from the suitable GNSS code signals, and which is provided to other GNSS receivers.

The position determination is "instantaneous", and typically repeated consecutively, so a position information can be updated quasi-continuously. The position information as such may be derived from the propagation time of the received GNSS code signals (i.e. the shifts of the received GNSS code signals with respect to the corresponding reference signals, which indicate a distance of the GNSS receiver to the respective satellite each).

A GNSS code signal can be considered suitable for position determination if it is sufficiently free from errors (corruption) due to multipath signal components, in particular such that the propagation time can be determined with good accuracy resp. reliability.

The GNSS receiver comprises an antenna and a sensor. The GNSS receiver is typically installed on a vehicle (such as a train or an aircraft), but may also be stationary, or may be carried by a person.

Preferred variants of the invention:

In a preferred variant of the inventive method, the prompt chip spacing is chosen at the maximum of the autocorrelation function. This is particularly simple. Position determination errors due to wrong prompt chip spacing are unlikely since GNSS code signals strongly affected by multipath signal components (which could shift the prompt chip spacing with respect to the maximum) have been excluded.

In an advantageous variant, the chip spacings of the multitude of function values of the autocorrelation function are chosen predominantly, preferably completely, on the late side with respect to the prompt chip spacing. This has shown particularly reliable detection of multipath signal components. Signal paths including a reflection are longer than the direct signal path, and therefore will appear on the late side. With this variant, this asymmetry in the autocorrelation function will be better covered.

Further preferred is a variant wherein at least 3, preferably at least 6, most preferably at least 8, functional values contribute to the test metric. This increases the reliability of detection of multipath signal components.

In an advantageous variant, during analysis of the functional values, pairwise differences of functional values with successive chip spacings are calculated, and these differences are used to calculate the test metric. This has been found to reduce signal noise in the test metric in many situations. Bias removal may be done on the functional values before calculating the difference, or may be done on the differences. Alternatively, the functional values themselves (after bias removal) may be directly used to calculate the test metric.

Further preferred is a variant in which the bias removal encompasses a normalization and/or variance scaling. This may reduce noise and makes the contribution of the various function values comparable.

Particularly preferred is a variant wherein the functional values contribute to the test metric in second or higher order, in particular wherein the functional values contribute to the test metric exponentially. This makes multipath signal components even easier to detect. It is also possible that the functional values contribute in third order (cubic), or fourth order, or even higher. For example, the test metric may be calculated as a root mean square value. Preferred are even orders. In general, and in particular in case of odd orders, absolute values of contributions to the test metric should be calculated.

A particularly advantageous variant provides that in said decision the test metric is used such that in case the test metric is larger than a critical value, the received GNSS code signal is considered unsuitable for position determination. This is a particularly simple procedure. If necessary, an absolute value may be generated before doing the comparison with the critical value. Alternatively, a range or ranges of values may be defined for the test metric, and a received GNSS code signal is considered unsuitable for position determination if its test metric is outside said ("allowed") range or ranges.

Further preferred is a variant which is characterized in that position determinations are done repeatedly, that carrier waves carrying the GNSS code signals undergo a low pass filtering, and that in case a received GNSS code signal of a satellite has been found unsuitable for position determination using the test metric, a number of subsequent received GNSS code signals of the same satellite will be considered as unsuitable for position determination, too, regardless of obtained test metrics for these subsequent GNSS code signals. The low pass filtering of the carrier wave reduces noise. In this variant, the test metric is not low pass filtered or low pass filtered with a time constant shorter than the time constant of the low pass filtering of the carrier wave, resulting in a "non-coherent" test metric. The detected multipath corruption affects the position determination with delay, and the blocking of the number of subsequent GNSS code signals avoids entry of the multipath corruption into the position determination. The number of subsequent received GNSS code signals depends on the time constant of the low pass filtering (or smoothing) of the carrier wave (or on the difference of time constants, in case the test metric is also low pass filtered). Note that in each repetition of position determination, newly received GNSS code signals are used.

Another variant is characterized in that position determinations are done repeatedly, that carrier waves carrying the GNSS code signals undergo a low pass filtering, and that said low pass filtering is reproduced in the test metric. The low pass filtering of the carrier wave reduces noise. The low pass filtering of the carrier wave and the reproduced low pass filtering of the test metric have basically the same signal properties in terms of spectral density and timely behavior. The low pass filter applied to the test metric will in many cases not be identical to the low pass filter used in the processing of the GNSS code signal in the receiver processing for position determination. In this situation, the low pass filter applied to the test metric models the relevant signal characteristics of the filter applied to the GNSS code signal processing. Thus a "coherent" test metric can be obtained, despite of the delayed arrival of the multipath corruption at position determination.

A highly preferred variant provides that a number N of GNSS receivers are operated simultaneously, with $N \geq 2$, wherein the different GNSS receivers receive GNSS code signals from a number J of satellites, with $J \geq 2$, and that the decision whether a particular GNSS code signal from a particular satellite received at a particular GNSS receiver is suitable for a position determination or unsuitable for a position determination due to multipath signal components is not only depending on the test metric of this particular GNSS code signal, but also depending on the test metrics of GNSS code signals received by the other GNSS receivers and/or from the other satellites. By operating multiple GNSS receivers, the position determination may be further improved in accuracy. Non-common errors at different GNSS receivers may be reduced, for example by averaging obtained signal information. At least some of the GNSS code signals received at the N different GNSS receivers originate from the same J satellites. By analyzing other test metrics than the one of the particular GNSS code signal, defects at receivers or satellites may be found which corrupt position determination. In this variant, in addition to a direct control of the test metric of a particular GNSS code signal, at least one additional discriminator is applied in order to find out whether the particular GNSS code signal may be corrupted (due to multipath signal components or other causes). This increases accuracy and reliability of the position determination. In general, the additional discriminator is applied to all received GNSS code signals. Typically, $J \geq 4$ and $N \geq 4$. Of particular importance are the test metrics of GNSS code signals received by the other GNSS receivers and/or from the other satellites which exceed a threshold, indicating a multipath error; these are preferably used (analyzed) in this variant.

In a further development of this variant, in case covariance of test metrics from different GNSS receivers belonging to received GNSS code signals from the same satellite exceeds a threshold, all received GNSS code signals from that satellite are considered unsuitable for position determination. In this case, a defect at the particular satellite is likely, and its GNSS code signals are no more trustworthy. Their exclusion improves the position determination reliability. Note that a covariance is typically used normalized, i.e. as a correlation. The covariance of the test metrics may be bi-variate or multi-variate. In particular, a second discriminator, describing the degree of the commonality of the error from all receivers, 1 . . . N, onto one specific receiver, o, is applied. In environments with $N>3$ the use of this additional discriminator reduces the number of tests to be performed to identify a faulty receiver down to N tests compared to $(N^2-N)/2$. If the test metric for a particular satellite received at different GNSS receivers corresponds to a multi-variate covariance determined for more than 2 receivers, the multiple discriminator can be used to increase the confidence whether an error condition is local to the receiver or is due to a satellite fault.

In another further development, in case covariance of test metrics from the same GNSS receiver belonging to GNSS code signals from different satellites exceeds a threshold, all received GNSS code signals at that GNSS receiver are considered unsuitable for position determination. In this case, a defect at the particular GNSS receiver is likely, and GNSS code signals received there are no more trustworthy.

Their exclusion improves the position determination reliability. The covariance of the test metrics may be bi-variate or multi-variate.

In another preferred further development, in case for a particular GNSS receiver, a critical fraction of received GNSS code signals is considered unsuitable due to the test metric of the respective received GNSS code signal in each case, then all GNSS code signals received at the particular GNSS receiver are considered unsuitable for position determination. In this case, a defect at the particular GNSS receiver is likely, and GNSS code signals received there are no more trustworthy. Their exclusion improves the position determination reliability. If J≥4, then the critical fraction typically corresponds to 2 unsuitable GNSS code signals.

A further development provides that in case for a particular satellite, a critical fraction of GNSS code signals from the particular satellite received at different GNSS receivers is considered unsuitable due to the test metric of the respective received GNSS code signal in each case, then all GNSS code signals from that satellite are considered unsuitable for position determination. In this case, a defect at the particular satellite is likely, and its GNSS code signals are no more trustworthy. Their exclusion improves the position determination reliability. If N≥4, then the critical fraction typically corresponds to 2 unsuitable GNSS code signals.

In an advantageous variant, one or a plurality of GNSS receivers is placed on a train, in particular a running train. GNSS receivers on trains are likely to be affected by significant multipath signal components, since trains often travel in urban or geographical canyons, where signal reflections are likely. Here the invention may be particularly useful in increasing the reliability of position determination.

Also within the scope of the present invention is a GNSS receiver or a set of GNSS receivers, adapted for performing an inventive, above described method.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

BRIEF DESCRIPTIONS OF THE DRAWINGS

The invention is shown in the drawings.

DETAILED DESCRIPTION OF THE PREFERRED EMBODIMENTS

1. Problem Address by the Invention

Multipath Errors

Local errors can result from the reception of reflected signals (multipath) entering the GNSS receiver with a delay compared to the direct signal. Multipath is known as combined signal reception of the direct line-of-sight ranging signal and one or more reflected ranging signals of the same satellite, which are travelling a longer path.

Figure 1:
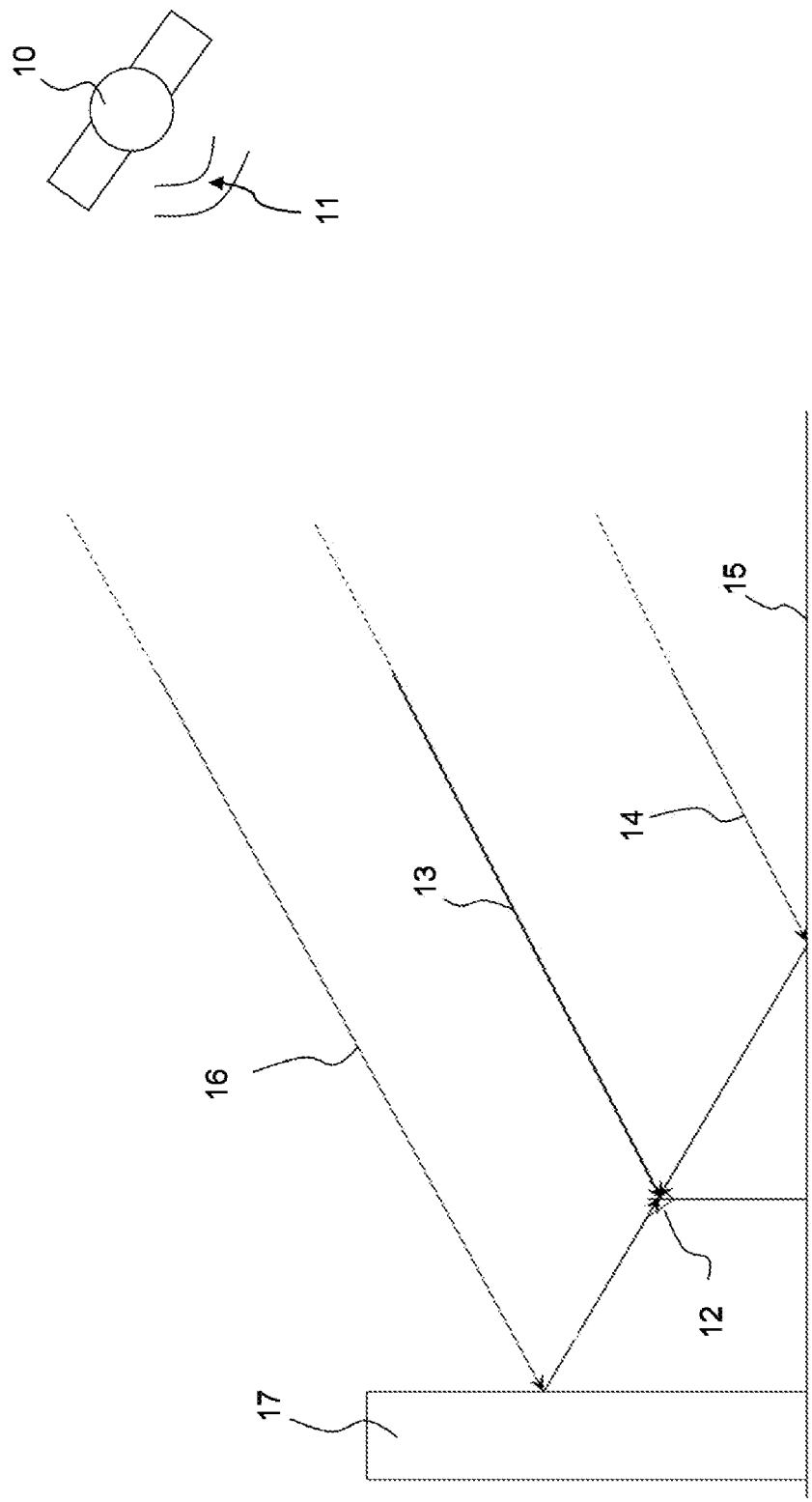
FIG. 1 shows a schematic illustration of multipath as combined reception of direct and reflected signal.

FIG. 1 shows multipath as combined reception of direct and reflected signals. A satellite 10 sends out a signal 11. At the GNSS receiver 12, a direct signal (or signal component) 13, a signal (or signal component) 14 reflected on the ground 15, and a signal (or signal component) 16 reflected by a reflector 17, here a vertical obstacle such as a building, arrive and superimpose, so the total received GNSS code signal contains multipath signal components. The GNSS receiver may be placed on a vehicle, such as a train (not shown).

Local uncorrelated multipath (single satellite on single antenna) or correlated multipath (single satellite on more than one antenna) are part of the considerations. In addition, Non-Line-Of-Sight (NLOS) multipath is characterized by the absence of the direct path (masked signal) and presence of multipath signals.

The reception of multipath affected GNSS signals due reflections in the local environment of the GNSS antenna lead to very high code measurement errors and finally errors of the position determination. In GNSS systems applying or generating differential corrections for the position determination process (GBAS, SBAS, VB) multipath is the largest error source.

The dominant GNSS threat for railway applications is multipath, which largely depends on the local environment where trains are travelling. In particular the urban railway multipath environment is harsher compared to other applications because multipath reflection sources such as but not limited to reflections from metal objects, buildings and ground reflections, may cause significant pseudorange errors that transform into the position solution.

In safety critical GNSS applications it is desirable to detect multipath in order to avoid usage of affected measurements in the position error determination. Otherwise erroneous position solutions will result.

Since other error sources like satellite faults (such as imperfect code generation within the satellite) can show up with similar effects, it is desirable to distinguish multipath from other errors to apply the correct actions (special relevance for GBAS/SBAS, VB).

2. The Inventive Method

General

For the aeronautical GBAS application the invention proposes multiple GNSS antennas distributed on the ground, connected each to resp. being part of a GNSS receiver or sensor, which in turn outputs various measurement data in a realtime behaviour such as once or twice per second. The measurement data may include relevant GNSS measurements such as correlator amplitude outputs, pseudorange measurement carrier phase measurement, timing measurements or other ranging measurements. The invention proposes also one or multiple processing devices that are connected to resp. included in the GNSS receivers and are able to run the algorithms and methods described below.

For the train VB application, the invention proposes multiple GNSS antennas distributed on the train, connected each to resp. being part of a GNSS receiver or sensor, which in turn outputs various measurement data in a realtime behaviour such as once or twice per second. The measurement data may include relevant GNSS measurements such as correlator amplitude outputs, pseudorange measurement carrier phase measurement, timing measurements or other ranging measurements. The invention may include also other sensors such as odometer, radar or inertial sensors that are also delivering measurement data. In addition the invention proposes one or multiple processing devices that are connected to resp. included in the GNSS receivers and the sensor devices and are able to run the algorithms and methods described below.

Principle

The methodology proposes a multipath monitor mean to deselect receivers/antennas or corresponding GNSS code signals.

The multipath monitor can be applied to GNSS in general. The monitor can perform various executive actions: inflation of integrity parameters, set a mask for elevation-azimuth range, exclusion of satellite, exclusion of receiver.

The receiver/antenna deselector preferably additionally allows to manually disable individual receivers in cases where multiple receivers are installed.

Figure 2:
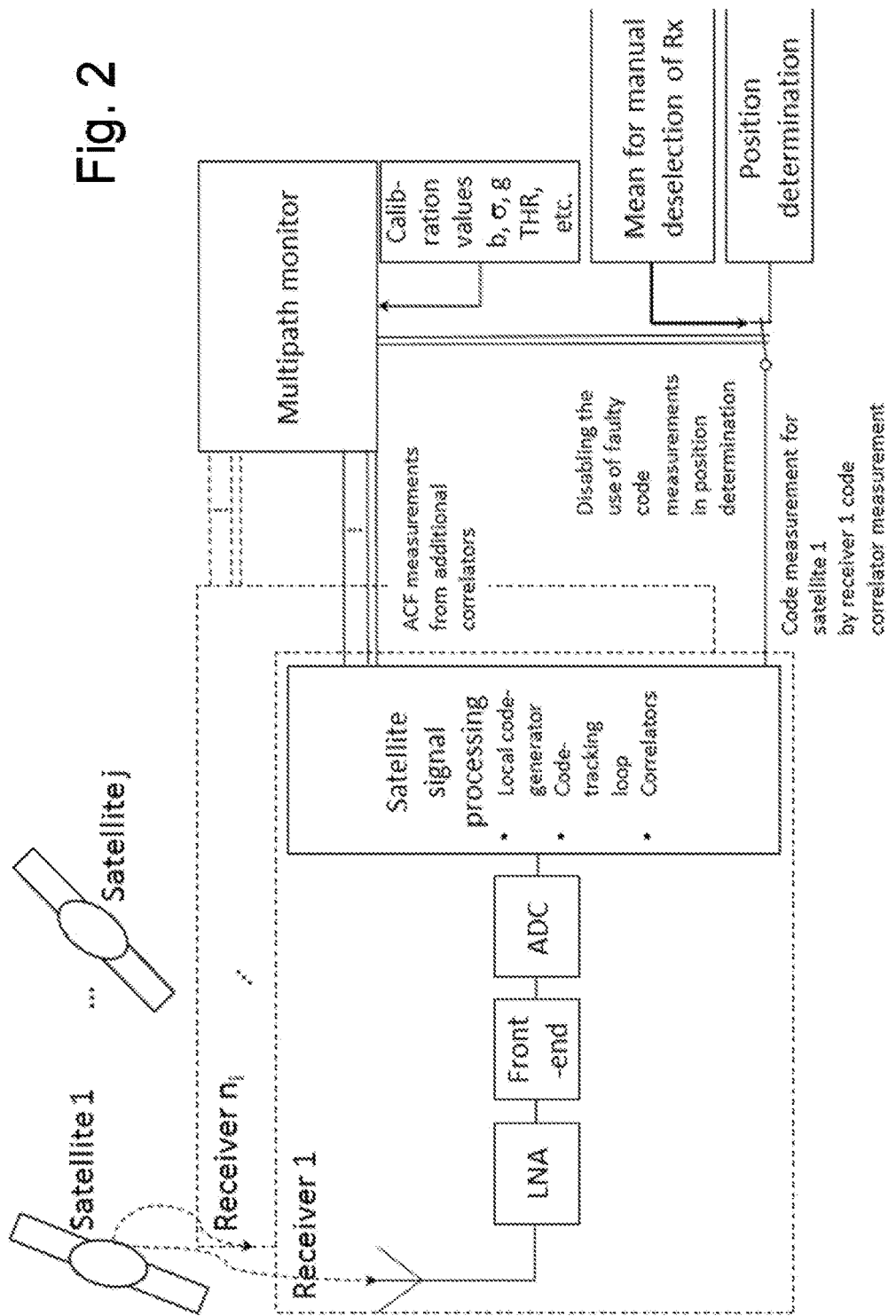
FIG. 2 shows a schematic illustration of the inventive multipath monitor principle.

FIG. 2 illustrates the inventive multipath monitor principle by way of example.

The multipath monitor continuously verifies that the received signal is suitable for the position determination. The verification is based on a monitor metric (or test metric) based on specific receiver measurements and additional calibration values. In case the monitor metric exceeds a certain threshold, the satellite or the receiver is removed from the position determination. In addition a manual deselection of a receiver can be performed.

GNSS Measurements from the GNSS Receiver

During the position determination the GNSS receiver determines the signal run time from the satellite j to the GNSS receiver i. The position determination can be performed simultaneously with multiple GNSS receivers (1 . . . $n_i$).

The satellite signal is typically represented by a high frequent carrier wave onto which a known (diffusion) code, which is individually set per satellite, with defined signal characteristics is modulated onto a high frequency carrier with predetermined frequency.

Figure 3:
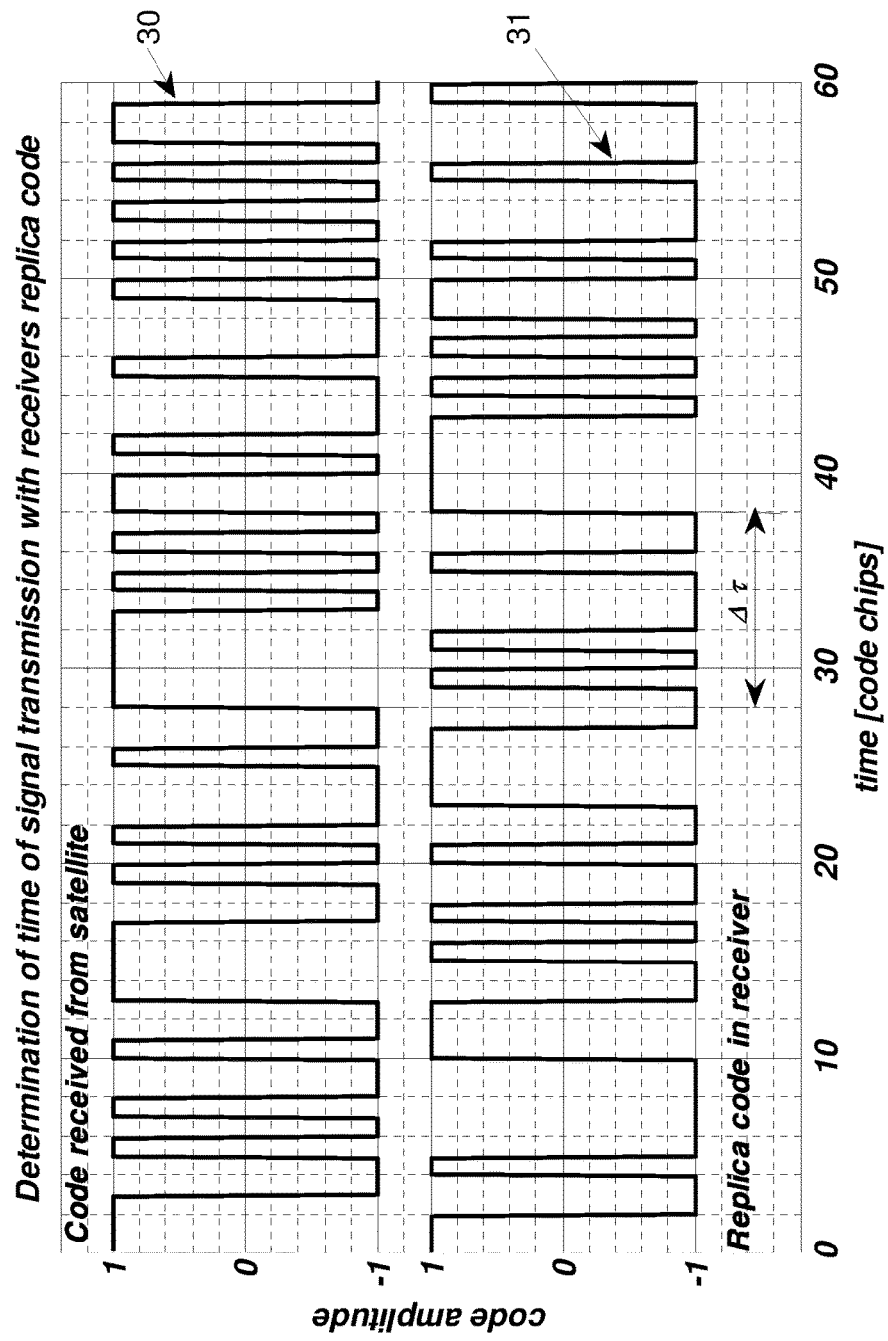
FIG. 3 shows a schematic illustration of the determination of signal run time by aligning received and local code.

FIG. 3 illustrates the determination of signal run time by aligning received code (or GNSS code signal 30) and local code (or reference signal 31). In the example shown, there is a time shift $\Delta\tau$ of about 10 chips between the received code and the reference code.

The signal characteristics of the modulated code typically are represented by a single maximum of the code autocorrelation function (ACF) for all time lags □ over the code length.

Figure 4:
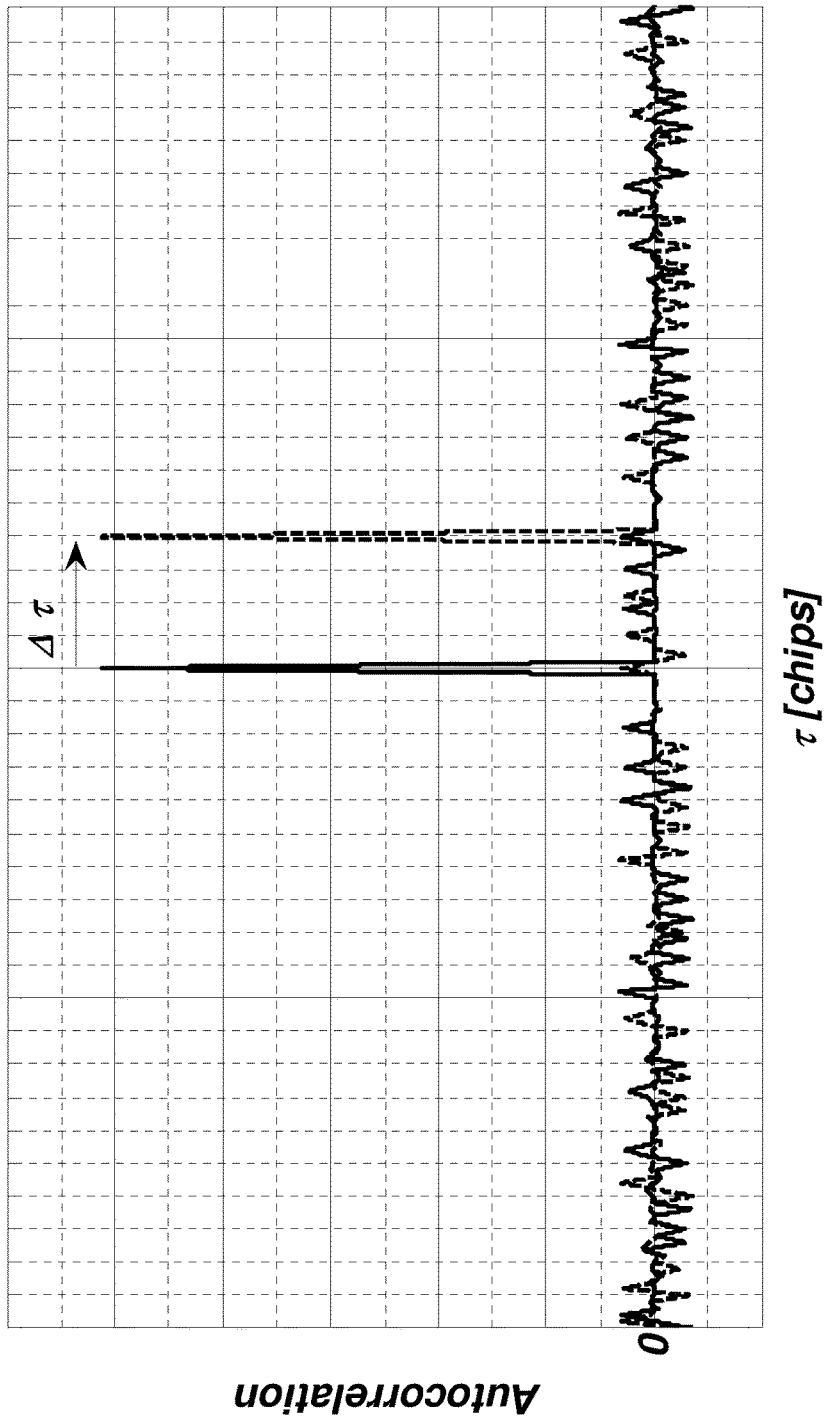
FIG. 4 shows a schematic illustration of the criterion for alignment of received and local code by maximum of code autocorrelation function.

FIG. 4 illustrates the criterion for alignment of received and local code by maximum of code autocorrelation function.

The determination of the signal run time is then based on the determination of the time difference between a zero lag ACF of the known code within the receiver (unbroken curve in FIG. 4) and the ACF of the received code from the satellite (broken line in FIG. 4). It thus shifts the local code until the ACF between the local and received code shows the maximum. However the ACF is not directly evaluated by the receiver.

To determine the signal run time the code received from the satellite is being tracked such that it is coherent to a local code replica. This is achieved by a signal tracking loop, the delay locked loop (DLL), which determines the code delay of the GNSS signal received from the satellite. The DLL provides the value of the currently determined delay which is used by the GNSS receivers code generator to keep the locally generated code matched to the received code. Within the DLL the difference between two additional correlators is used. These additional correlators are advanced "Early" (E) and delayed, "Late" (L) relative to the punctual zero delay "Prompt" (P). As a result of the differencing the S-curve is obtained and the DLL maintains zero crossing of the S-curve.

Figure 5:
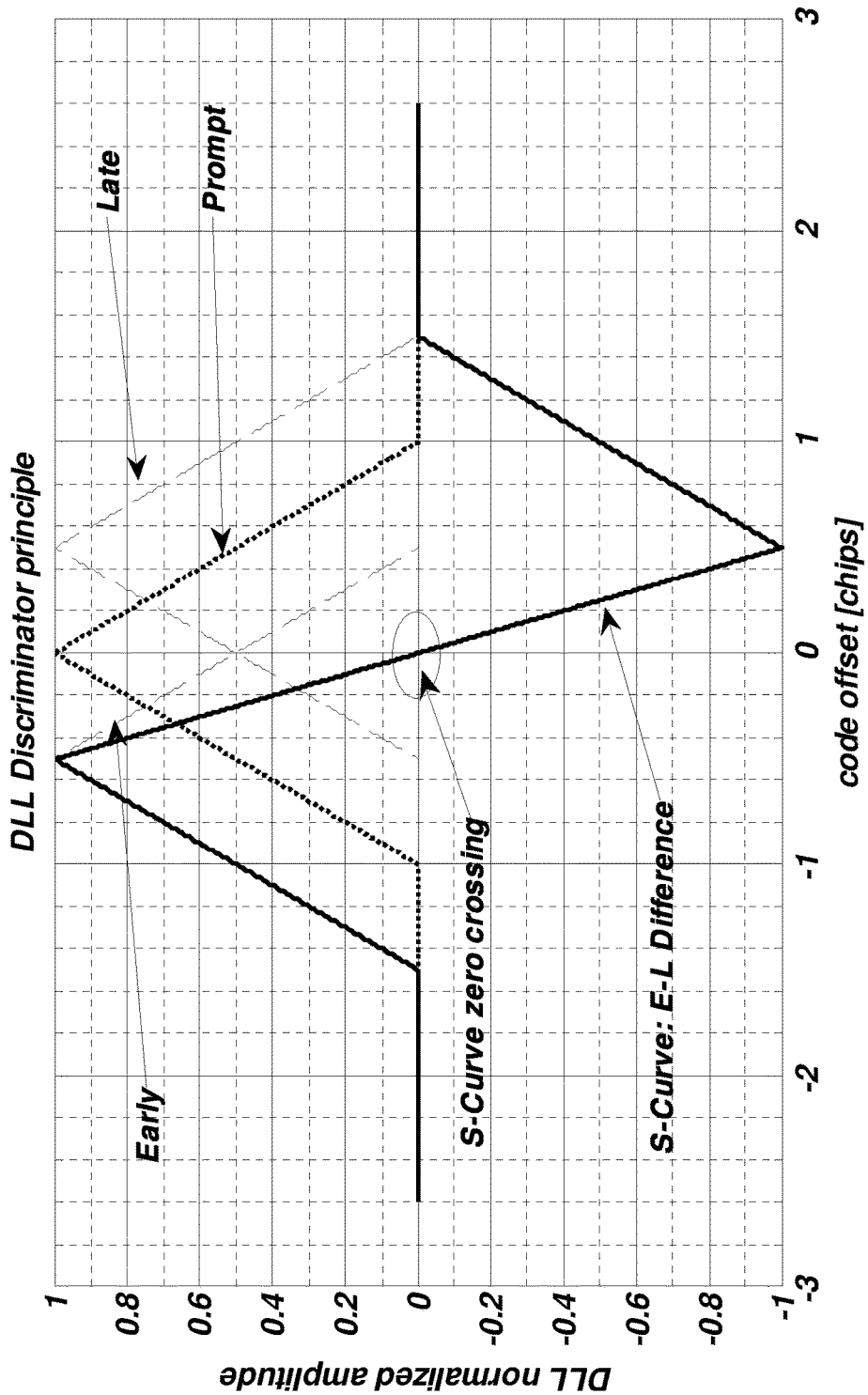
FIG. 5 shows a schematic illustration of a code tracking loop early minus late discriminator S-curve.

FIG. 5 illustrates the code tracking loop early minus late discriminator S-curve.

The DLL can be assisted by a phase locked loop (PLL) evaluating the phase of the high frequent satellites carrier wave and reducing the code noise.

The time shift $\Delta\tau$ is a measure for the signal run time from the satellite with the time of transmission ($T_{oT}$) to the receiver where it arrived at the time of arrival ($T_{oA}$). The signal run time in turn is a measure for the distance R between the satellite and the receiver. Both are related to each other by the speed of light c by the following equation:

$$R = c\Delta\tau = c(T_{oA} - T_{oT}) \qquad \text{Eq. 1}$$

In aforementioned description the clock differences between the clock of the GNSS receiver and the satellite are not considered.

Furthermore error sources like signal delays due refraction in ionosphere and troposphere as well as errors in the satellite position and imperfect code generation by the satellite and errors resulting in the vicinity of the GNSS receiver are not considered.

Preparation of the Detection of Multipath Signal Components

The GNSS receiver thus evaluates the ACF at three correlation points: early, late, prompt.

The chip spacing between the early and late ACF can vary. With reduced chip spacing also a reduced susceptibility to multipath errors will result.

Due to filters typically applied in the GNSS receiver at different stages of its internal signal processing, especially due to pre-correlation filtering, the real ACF deviates from the ideal one. The real ACF typically shows a rounded peak. Normalization of the receiver ACF can be achieved by normalizing relative to the maximum value of the real ACF prompt (P).

The multipath monitor described herein applies additional correlators beyond those needed for the DLL code tracking.

These additional ACF measurements can show a nominal bias under fault free conditions due to the aforementioned normalization. Additional nominal biases can result from typical imperfections in the satellites code generation, which are typical to its actual design and do not represent a satellite fault.

Figure 6:
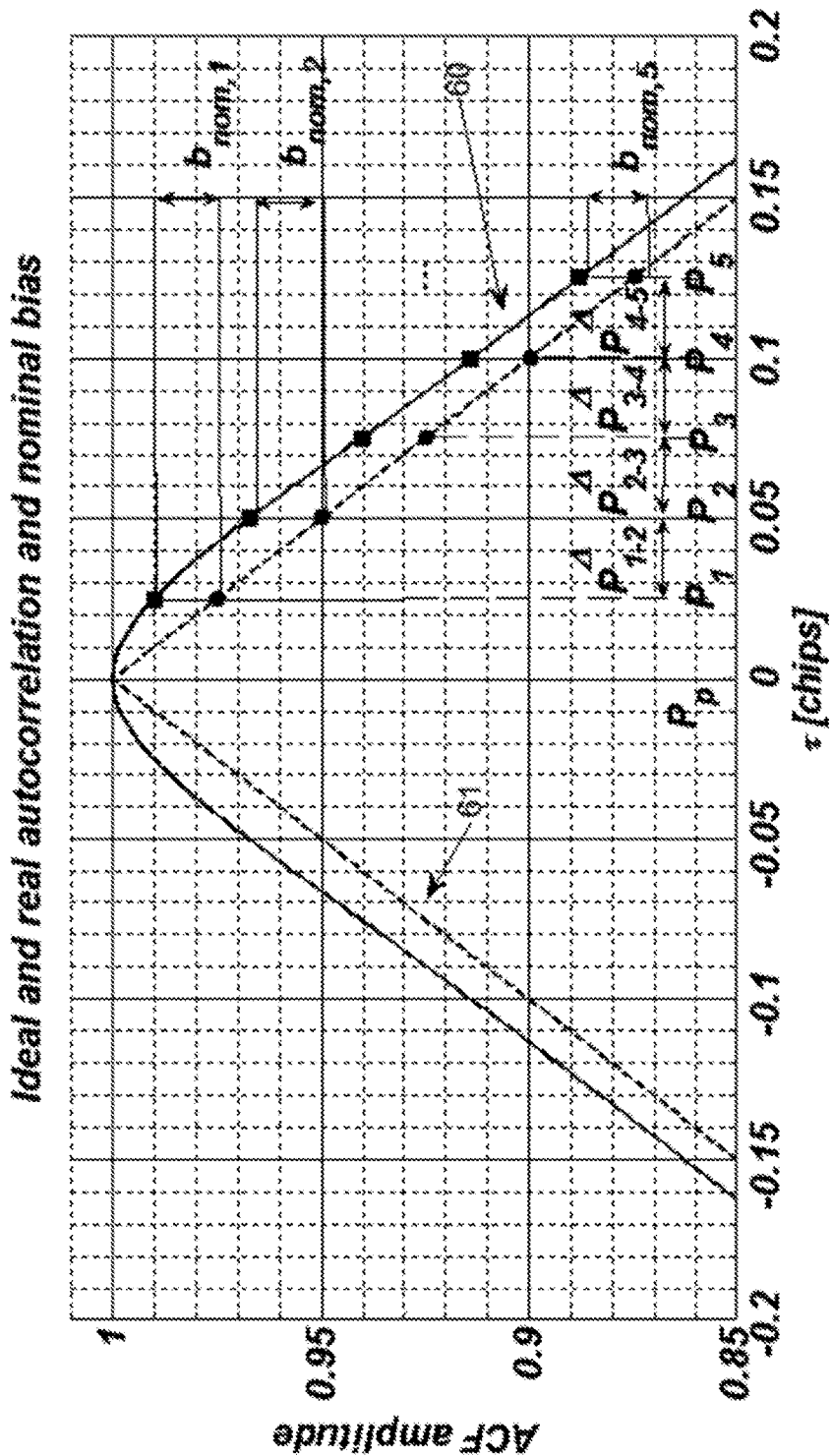
FIG. 6 shows a schematic illustration of peak of autocorrelator function in fault free conditions.

FIG. 6 illustrates the peak of a real autocorrelation function 60 (unbroken line) in fault free conditions, as compared to an ideal autocorrelation function 61 (broken line), both normalized. For the chip spacings (positions) $P_1$ through $P_5$, also the nominal bias $b_{nom.1}$ through $b_{nom.5}$ is shown. The prompt chip spacing $P_0$ is at zero chips.

With these additional correlators at each time instance of the position determination a multitude of function values (in FIG. 6 at $P_1$ through $P_5$) of the autocorrelation function in the GNSS receiver during determination of the satellite signal run time are taken.

Under presence of multipath the ACF within the receiver will be represented by the complex sum of the fault free/direct signal and the reflected multipath signal. Due to the multipath signal the ACF in the receiver will be deformed and the peak deviates from $\tau=0$ by $\tau=\tau_{MP}$.

Due to this deformation the measurements taken from the additional correlator chip spacings will deviate from their nominal range of values.

Figure 7:
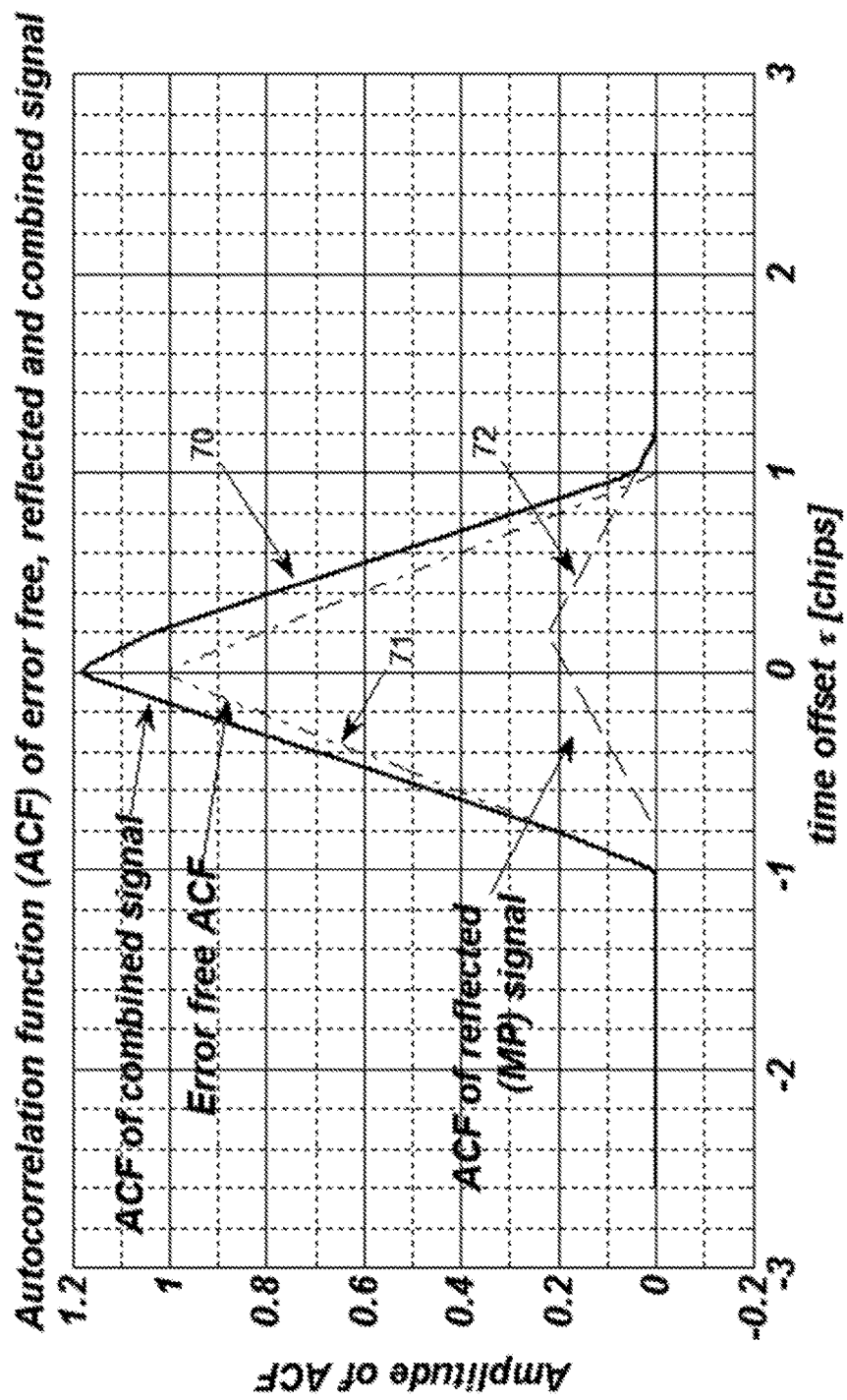
FIG. 7 shows a schematic illustration of a code autocorrelation function with multipath component.

FIG. 7 illustrates a code autocorrelation function with multipath (MP) component. The received autocorrelation function ACF of the combined signal 70 is the superposition of an error free ACF 71 and an ACF of reflected multipath signal 72.

Figure 8:
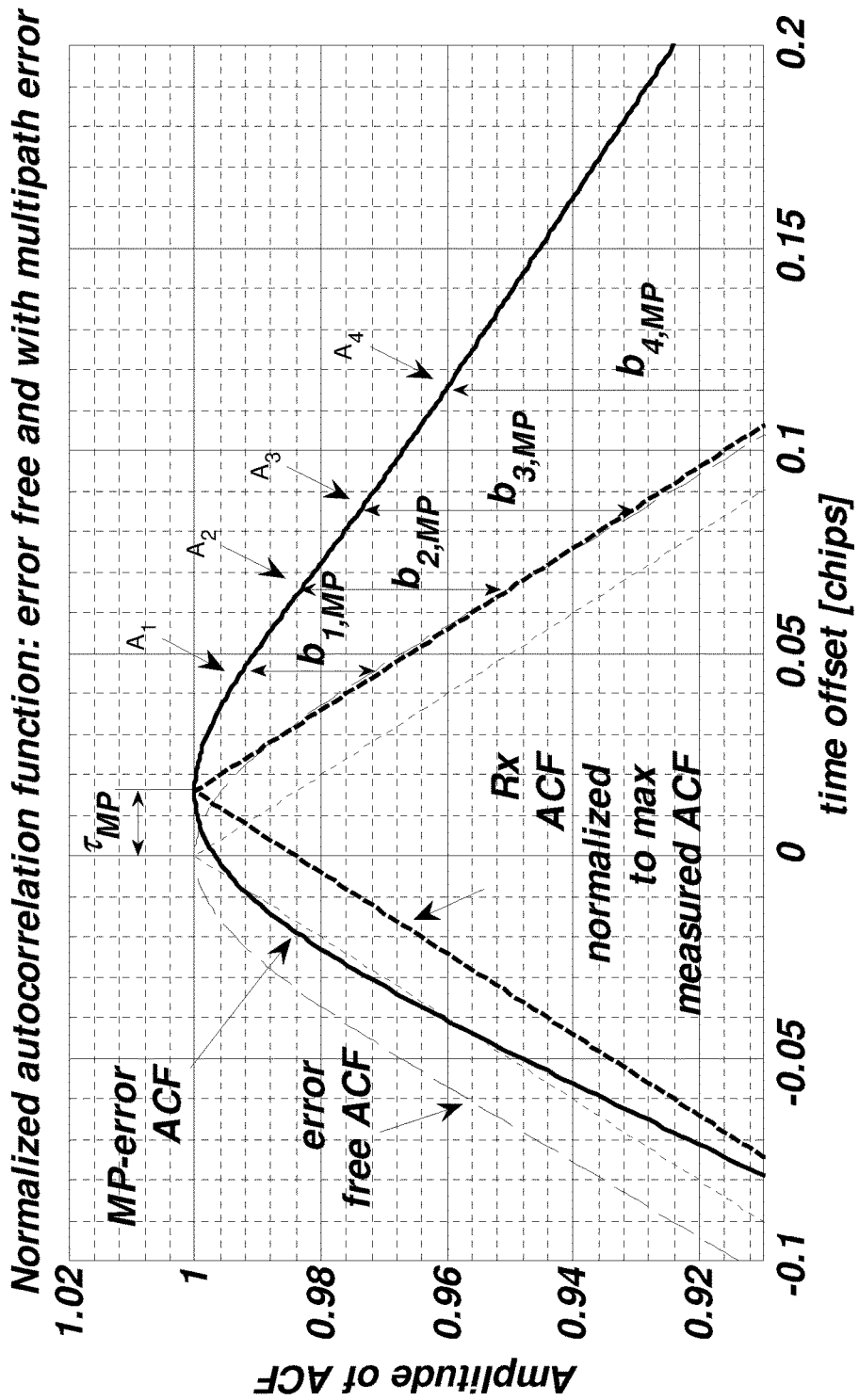
FIG. 8 shows a schematic illustration of a peak code autocorrelation function under multipath influence.

FIG. 8 illustrates the peak of code autocorrelation function under multipath influence (MP-error ACF). The information about the multipath error components is contained in the differences $b_{i,MP}$ of the (bolt unbroken) MP-error ACF curve, as compared to the (bolt broken, triangular) ideal ACF curve with multipath. Note that part of this difference is caused by the nominal bias, i.e. the difference between the (thin broken) error free ACF curve as compared to the ideal ACF curve (compare FIG. 6), what should be taken into account by removal of the nominal bias. In FIG. 8, also the time shift $\tau_{MP}$ caused by multilayer signal components between the error free ACF and the MP-error ACF curve is well observable.

The monitor test metric is built on observables stemming from a receiver's autocorrelation function at different autocorrelation chip spacings.

The examples are valid for a E-L (=early-late) coherent DLL type with 0.1 chip spacing for DLL tracking loop. However, the methodology works also with other receivers.

The chip spacings can be arbitrary. The multipath signals lead to stronger deviation on the late side (on the right in FIG. 8) of the ACF. Therefore the additional correlator measurements primarily are taken on the late side and have to be configured according to the expectable multipath delays $\tau_{MP}$. For a receiver with wide correlator more measurement points over a wider time offset range will be useful, compared to a narrow correlator, where a region closer around zero crossing needs to be measured.

Figure 9:
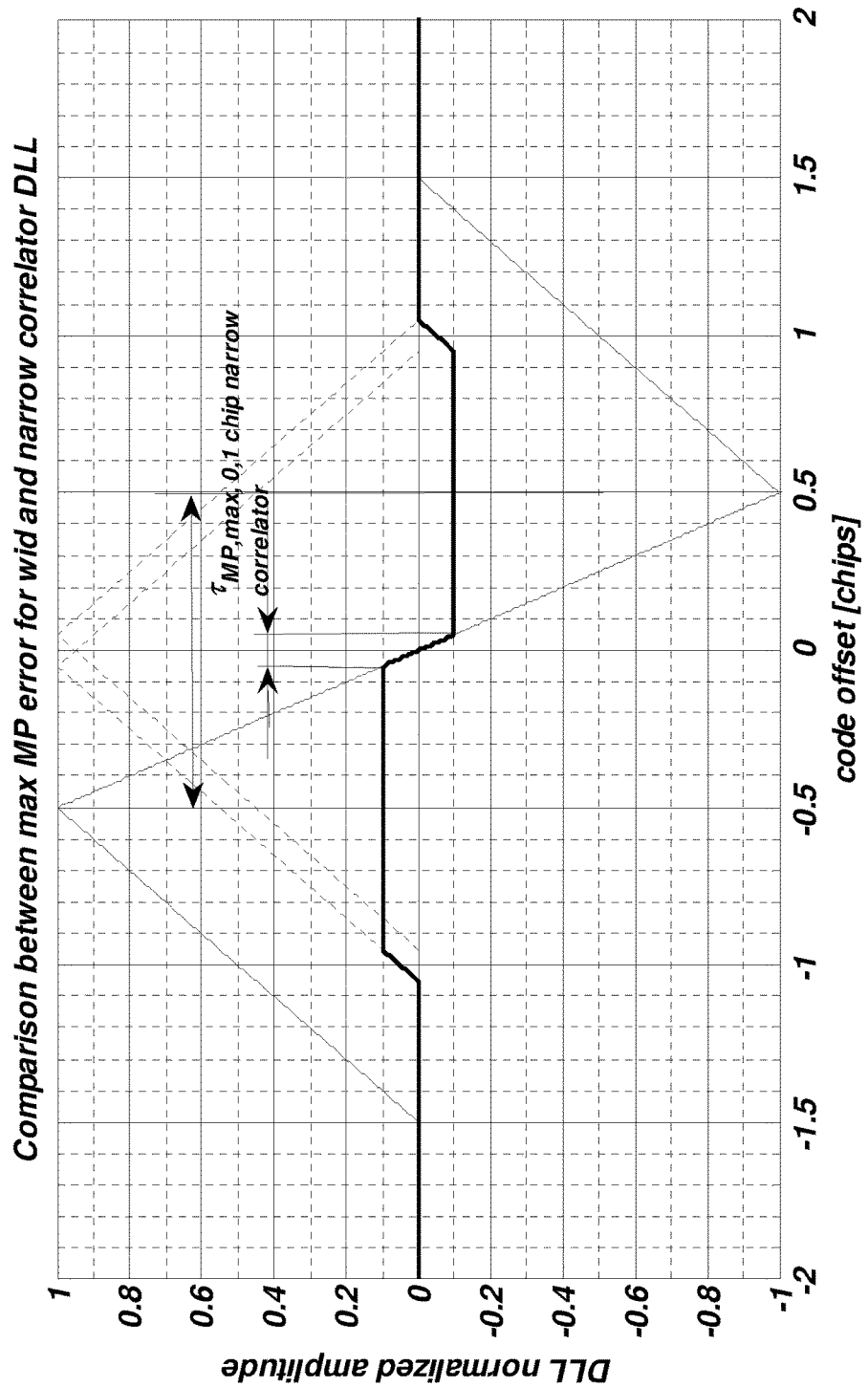
FIG. 9 shows a schematic illustration of a code discriminator curve for different correlator spacings of the code-tracking.

FIG. 9 illustrates the code discriminator curve for different correlator spacings of the code-tracking.

In the investigated case of a GNSS receiver with a chip spacing of 0.1 chips, eight correlator points with the following chip spacing were used (fractions of the GPS L1 C/A code length):

$P_1=-0.5$; $P_2=-0.025$; $P_3=0$; $P_4=+0.025$; $P_5=+0.05$; $P_6=+0.075$; $P_7=+0.1$; $P_8=+0.125$. In the general case n-measurements $P_1 \ldots P_n$ are taken.

The normalized ACF amplitude (functional values) at the respective points are $A_1$; $A_2$; $A_3$; $A_4$; $A_5$; $A_6$; $A_7$; $A_8 \ldots A_m$ In the further processing these can either directly be used as is or adjacent correlator measurements can also be differentiated in direction of increasing chip length, resulting in:

$$CDV_1 = A_1 - A_2$$

$$CDV_2 = A_2 - A_3$$

$$CDV_3 = A_3 - A_4$$

$$\ldots$$

$$CDV_n = A_{m-1} - A_m \qquad \text{Eq. 2}$$

A normalization with respect to nominal conditions can be performed. During this normalization at least the removal of the nominal bias $b_n$ can be performed. The nominal bias can be determined by a model or through measurements in fault free conditions (see FIG. 6, where the nominal bias $b_{nom.i}$ is the difference between the ideal and real autocorrelation function under fault free conditions for chip positions $P_i$; note that when using differentiated functional values $CDV_i$, these have a nominal bias $b_{i,nom}$ originating from a difference of the $b_{nom.1}$ values of positions $P_i$).

Additionally a variance scaling by the nominal variance $\sigma_m^2$ can be performed such that the $CDV_{nom,1 \ldots m}$ are zero mean and a variance of one results in fault free conditions.

$$CDV_{1,nom} = (CDV_1 - b_{1,nom})/\sigma_{1,nom}$$

$$CDV_{m,nom} = (CDV_m - b_{m,nom})/\sigma_{m,nom} \qquad \text{Eq. 3}$$

The normalization values for each CDV are pre-determined in fault free conditions and stored in a non-volatile memory of the monitor.

The nominal bias is composed of nominal receiver inherent correlator properties and hardware delays, as well as a satellite specific component. It is constant over longer periods of time and can be either configured as calibration value or automatically determined from periods of fault free operation.

General Monitor Principle

A change detector or monitor as applied in the present invention, and applicable in safety critical applications, detects faulty measurements and removes these faulty measurements from the further processing, i.e. from the position determination.

The applied detector performs a statistical hypothesis test for the two hypothesis:

H0: the measurement is fault free
H1: the measurement is faulty

The test decision is performed on a test metric. The test metric typically shows under fault free conditions zero mean. Under influence of a fault condition the test metric shows a bias.

In the most simple case, the test metric could be based on a first order process and changes in the mean of the test metric would be detected.

Figure 10:
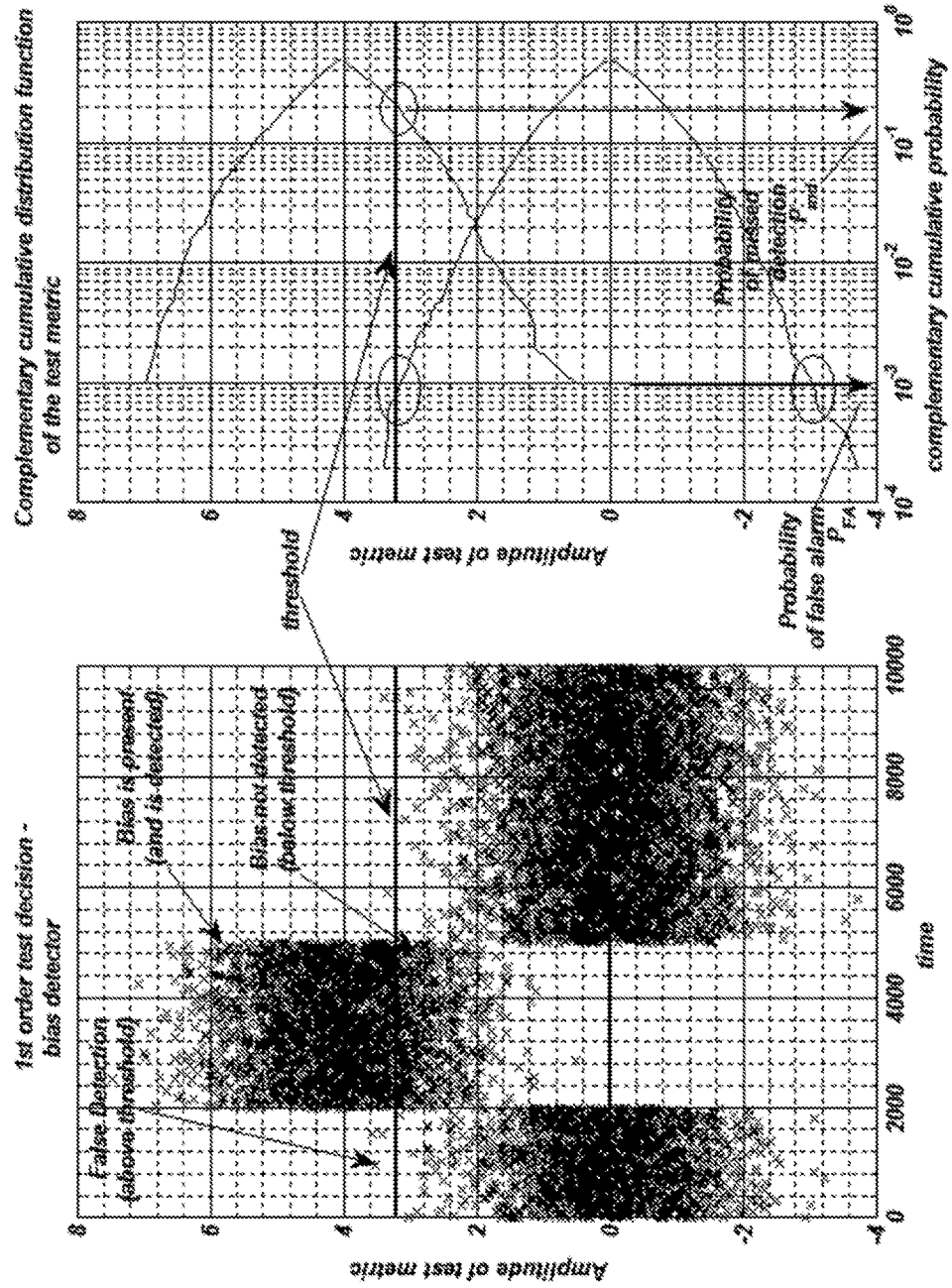
FIG. 10 shows a schematic illustration of the general monitor principle, timely (left) and statistical (right) view.

FIG. 10 illustrates a general monitor principle—timely (left) and statistical (right) view.

Background and Advantages in Using Higher Order Test Metrics to Detect Multipath Due to the satellite movement and potential movements of the receiver and the reflector, the multipath geometry constantly varies. With this variation the angles under which the reflections enter the receiver constantly change. With the angular change also the delay of the reflected signal constantly changes. Since the combined signal within the receiver is the sum of the direct and the reflected signal, an oscillatory component will result in the combined signal.

With the oscillatory component due to the multipath error a bias change is only present for certain fraction of time. With the oscillatory combined signal besides the mean, also the variance and the probability distribution shape parameters change.

Figure 11:
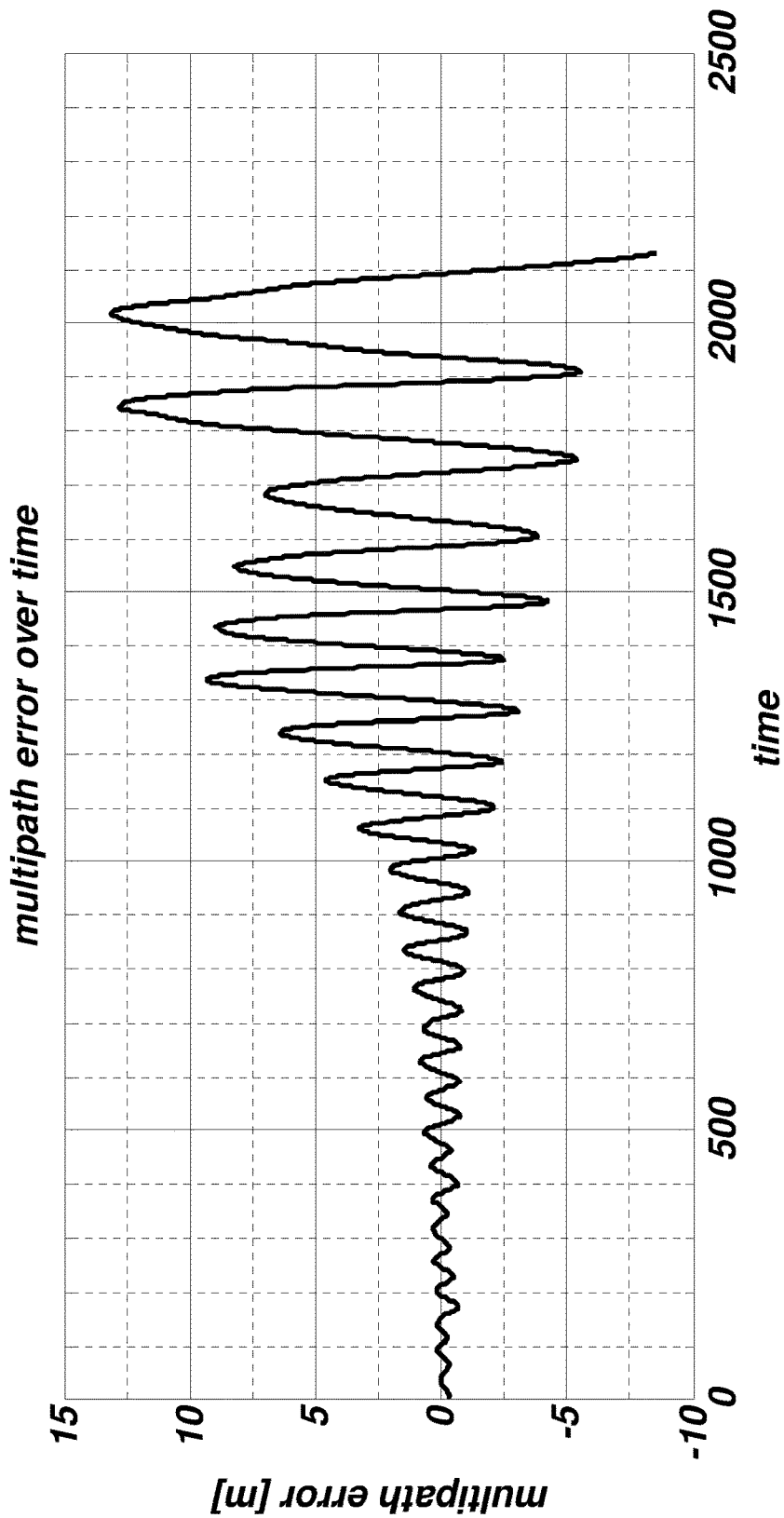
FIG. 11 shows a schematic diagram of an oscillation of multipath error over time.

FIG. 11 illustrates the oscillation of multipath error over time.

In fault free conditions the ACF values vary around their mean due to thermal noise.

Thermal noise can be described as white noise which follows a normal (Gaussian) distribution with zero mean (after bias removal) and thus a maximum at zero.

The probability density function of a pure sine wave (single multipath component) has its minimum at zero and maximum probability density values at −1 and +1 and thus a completely different shape of the probability density function.

With the multipath component the error distribution of the signal will change.

Figure 12:
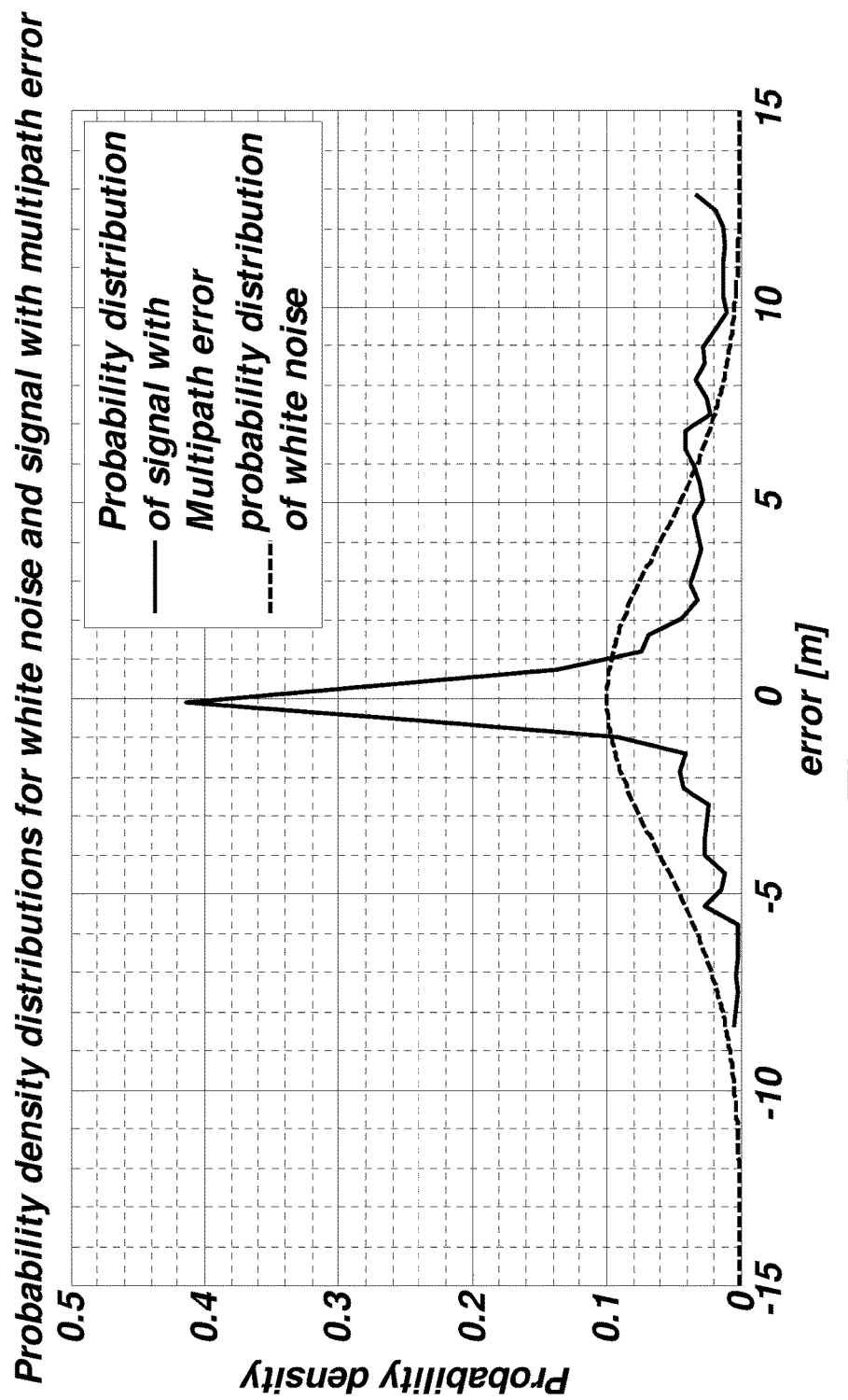
FIG. 12 shows a schematic illustration of change in statistical properties of the error distribution under influence of multipath.

FIG. 12 illustrates the change in statistical properties of the error distribution under influence of multipath.

The distributions' shape parameters are described with higher order moments ($3^{rd}$ order—skewness, $4^{th}$ order—kurtosis).

In general the n-th statistical moment is defined as:

$$m_n = E(x-\mu)^n \quad \text{Eq. 4}$$

with the expectation value $E(x)$.

For zero mean distributed values, like white noise, the expectation value is zero.

Due to the change in the statistical properties of a multipath affected signal the higher order moments will increase over those for white noise.

Thus a test metric based on higher order test statistics can provide an increased detection capability for multipath errors. In parallel no increased susceptibility for pure bias errors (errors of $1^{st}$ order) will result. Moreover, the increase in the test metric will be over-proportional compared to a pure bias detector ($1^{st}$ order detector).

Typically such pure bias errors result from errors in the satellites signal generation, like imperfect code.

Especially in multi-GNSS receiver environments it is desirable to separate both types of errors.

Detection of Multipath Signal Components for the Current Measurement Time Instance $t_k$ and the Current Receiver $Rx_j$-Base Processing The detection is based on a statistical test. One way to detect changes in higher order statistical characteristics of the underlying signal (variance, skewness, kurtosis) is to collect samples over a certain measurement period and to perform statistical testing on these samples.

The measurement principle applied herein allows to determine higher order statistics based on the multitude of instantaneous correlator measurements.

The second order test metric $TM_2$ of the seven differentiated correlator measurements is determined as follows:

$$TM_2(t_k) = CDV_1^2(t_k) + CDV_2^2(t_k) + \ldots + CDV_m^2(t_k) \sim \text{var}(CDV_{1\ldots m}(t_k)) \quad \text{Eq 5}$$

The second order metric is proportional to the variance of the seven correlator measurement values (the second order metric can also be applied as root mean square (RMS)).

The determination of the RMS is a second order process, leading to a chi-square test metrics.

The second order process provides better detectability (detection to noise ratio) compared to a first order process (sum, differences, ratios or sum of abs correlator values).

Higher order processes can also be applied—polynoms of third, fourth and higher order as well as exponential process can be applied.

A further increase is feasible by using higher orders.

The n-th order test metric $TM_n$ built from the seven differentiated correlator measurements is determined accordingly:

$$TM_n(t_k) = CDV_1^n(t_k) + CDV_2^n(t_k) + \ldots + CDV_m^n(t_k) = \sum_{l=1}^{m} CDV_l^n \quad \text{Eq. 6}$$

In equivalence to the $2^{nd}$-order process, the n-th root can be applied to TMn.

For polynomial test metrics even order polynoms are preferable, since no negative values will result—the test statistics is then single sided.

The same applies for exponential test metrics.

The exponential metric can be built as follows:

$$TM_{exp}(t_k) = (e^{CDV_1(t_k)} + e^{CDV_2(t_k)} + \ldots + e^{CDV_m(t_k)}) = \sum_{l=1}^{m} e^{CDV_i(t_k)} \quad \text{Eq. 7}$$

The base to calculate the exponential can be adapted. It does not need to be equal to constant "e".

It will therefore be denoted as "lambda".

This variation provides another degree of freedom in building the test metric. It will change the tail behavior of the distribution and allows for adaptation according to actually required trade-off between false alarm and missed detection rates.

The exponential metric is related to higher order polynomials since the exponential function can be expressed by a Taylor-polynomial:

$$\exp(x) = 1 + x + \frac{x^2}{2} + \ldots \frac{x^n}{n!} \quad \text{Eq. 8}$$

Thus the exponential metric contains all moments of the distribution and is capable to provide an optimal detection to noise ratio.

The detection is performed against a predefined threshold TRH.

The threshold is defined according to the desired false alarm and missed detection rates based on the statistical distribution.

Figure 13:
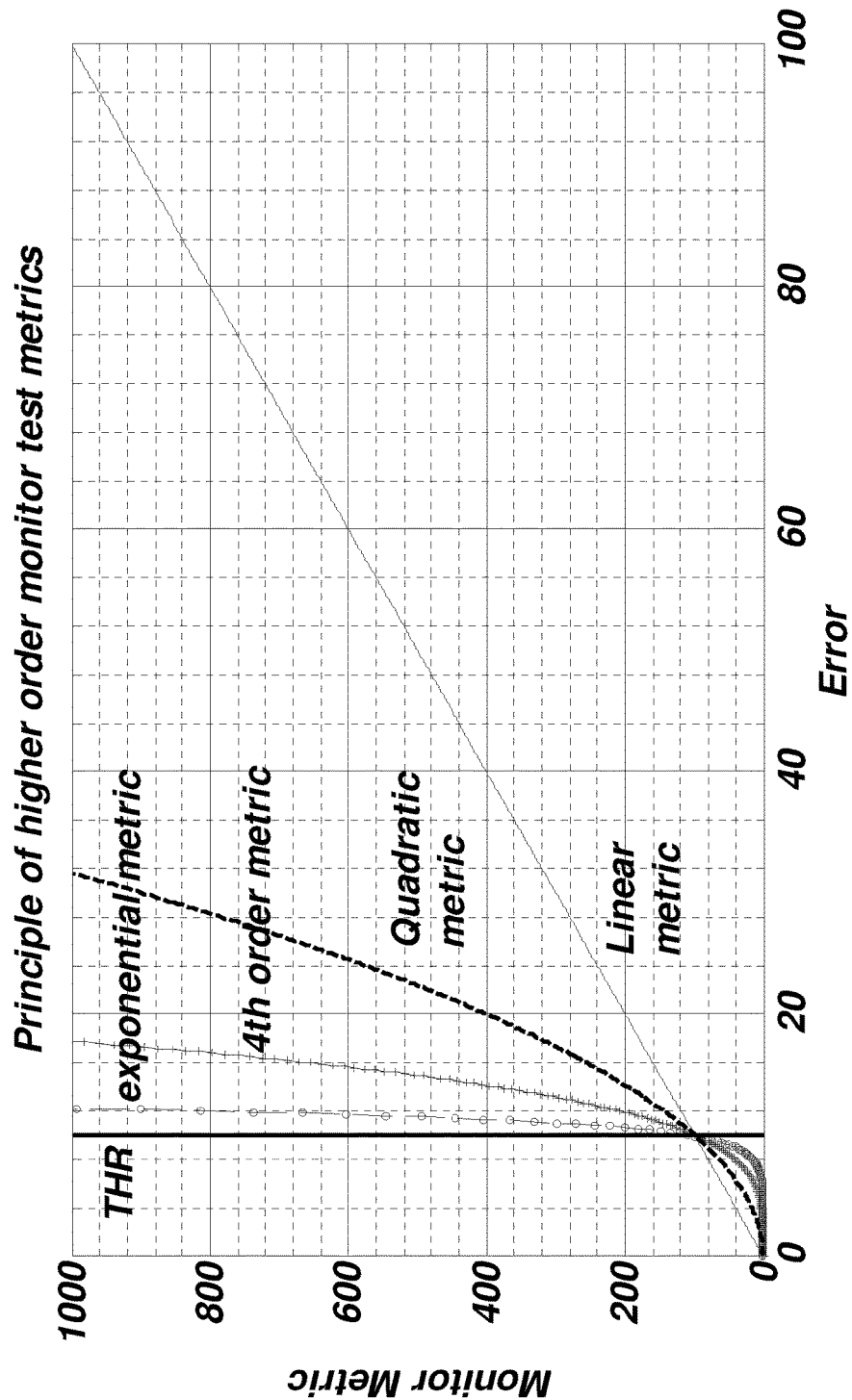
FIG. 13 shows a schematic illustration of the principle of non-linear monitor test metrics.

FIG. 13 illustrates the principle of non-linear monitor test metrics.

The threshold depends on either a maximum tolerable error or a fixed inflation compared to the nominal unfaulted measurement characteristics.

The threshold is in all cases determined from the inverse of a distribution function. In case of derivation from fault free case—derivation for probability of false alarm ($P_{FA}$), or distribution of missed detected errors—derivation for probability of missed detection ($P_{MD}$).

In case of $P_{FA}$ based derivation the general form is:

$$THR \sim k \cdot CDF^{-1}(1 - P_{FA}, TM) \quad \text{Eq. 9}$$

Examples:
1$^{st}$ Order:

$$THR_1 = N^{-1}(1-P_{FA}, \mu=0, k_{FA}\sigma_{TM})$$ Eq. 10

For the expression of higher orders it is necessary to express the distributions using the gamma function:

$$\Gamma(\alpha) = \int_0^\infty t^{\alpha-1} e^{-t} dt$$ Eq. 9

The gamma distribution is:

$$f_\Gamma(x) = \frac{1}{\Gamma(\alpha)} x^{\alpha-1} e^{-x}$$ Eq. 10

2$^{nd}$ order metric is chi-square distributed: $THR_2 = (\chi^2)^{-1}(1-P_{FA}, f_{TM})$ with $f_{TM}$ as degrees of freedom of the test metric, which is equal to n, the number of values in the test metric.

The chi-square distribution is related to the gamma distribution as:

$$\Gamma\left(\frac{f_{TM}}{2}; \frac{1}{2}\right)$$

distribution with the density function:

$$CDF_{\chi^2} = P\left(\frac{f_{TM}}{2}, \frac{x^2}{2}\right)$$ Eq. 11

The fourth order metric is chi-cubed distributed, according to the increase in order, etc.

$$CDF_{\chi^n} = P\left(\frac{f_{TM}}{n}, \frac{x^n}{n}\right)$$ Eq. 12

The exponential distribution is expressed with the parameter lambda used to define the trade-off between $P_{md}$ and $P_{FA}$ (with the base to relate lambda $\sim f_{TM}$):

$$Exp(2) = \Gamma(1, \lambda)$$ Eq. 13

$$THR_{exp} = Exp^{-1}(\lambda) = \Gamma^{-1}(1, \lambda)$$ Eq. 14

The test metric calculated from the correlator measurements is compared against the predefined threshold. The threshold is fix for constant operational conditions (an adaptation to the operational mode can be applied).

The test metric is determined for each receiver and for each code measurement used in the system.

Thus in case with four reference antennas/receivers and $n_j$ satellites being tracked, 4×$n_j$ measurements exist, which individually will be compared against its threshold.

When the threshold is exceeded, the pseudorange measurement of the respective receiver with respect to the respective satellite is made unavailable.

Further, in the simplest case, a receiver related monitor action will be performed if more than 2 code measurements of the respective receiver simultaneously are affected, i.e. the threshold is exceeded. Then the entire receiver is made unavailable.

When the test metric TM for the respective satellite j measured with receiver i at respective time instance k exceeds the threshold THR, the code measurement for the respective satellite is excluded from the position determination and an exclusion counter N_excl is counted up:

```
If
   TM > THR
then
   exclude code_measurement(j, i, k)
   and
   n_excl = n_excl + 1
```

In case of four reference receivers and n_sat satellites being tracked, 4×n_sat test metrics exist, which individually will be compared against its threshold.

A second discriminator can be applied, which decides whether a satellite is made unavailable for the position determination or whether a reference receiver is to be excluded. If the threshold is exceeded for example on one or alternatively two GNSS signals or more from different satellites on the same receiver, the receiver will be considered as faulty. If the threshold is exceeded for example on two (case of train) or three (case of ground based augmentation systems for aeronautical use) receivers or more for GNSS signals from the same satellite, the satellite will be excluded.

If the test metric for too many satellites n_excl,max at the respective time instance k exceeds the monitor threshold at a receiver, exclude the receiver from the position determination (if only one receiver is available, the position determination will be inhibited):

```
If
   n_excl > n_excl,max
then
   exclude i
```

Use of Coherent and Non-Coherent Test Metrics when the Position Determination Applies a Low Pass Filter Process The position determination may apply a low pass filter process to reduce the noise errors of the position determination.

The typically applied process uses complementary filtering using the carrier measurements (Code-Carrier-Smoothing).

With applied low pass filtering the build-up of a multipath induced error in the position determination is typically delayed according to the step response of the according filter.

The correlator measurement will not show this delayed error built-up, since no filter is applied to them.

However, a low pass filter $H_{LP}$ can be applied to the test metric for two reasons:

Monitor Noise can be Reduced by Low Pass Filtering:

This increases the detectability of multipath error conditions: The time constant and filter characteristics need to be chosen to be compliant with the range measurement processing. The filter characteristics need to be defined such that the filter applied to the test metric shows the same timely and spectral characteristics compared to the filter applied to the code measurements used in the position determination (i.e. impulse response is identical). In case of safety critical aeronautical applications 0.30 s and 100 s smoothing are applied to a 1st order low pass filter. This ensures coherency with unsmoothed and code-carrier smoothed pseudorange errors.

Monitor can React Before the Position Determination is Faulty:

If the monitor is made non-coherent (for instance by smaller time constant of the test metric filtering, compared to the one of the pseudorange smoothing filter), a 'look ahead' monitor characteristics can be achieved—it can be made faster. If done so, the monitor is no more coherent with the error and thus an additional high pass filter or a hold back is to be applied to ensure the test metric remains high for the longest multipath autocorrelation time.

Trade-offs between both are feasible, like the mentioned smaller time constant compared to the time constant of the filter used in the position determination.

To allow for easier statistical characterization the monitor test metric can be normalized to a variance of 1 with applied filter in the fault free case by dividing through the nominal variance. The nominal variance depends on local environment (which doesn't change over time) and the applied filters to the test metric and thus is constant during operation.

The compensation gain is determined from the spectral characteristics of the filter applied to the test metric:

$$g \sim \left( \frac{\text{var}_{unfiltered}}{\text{var}_{filtered}} \right) \quad \text{Eq. 15}$$

The variance of the filtered, error free signal is related to the variance of the unfiltered error free noise and transfer function of the low pass filter. Alternatively direct measurement in error free conditions is also possible.

The further processing is identical to the one previously described: the test metric is build based on the (filtered and compensated) CDV and compared against the threshold. In case of the non-coherent test metric in addition a high pass filter or hold process is applied to inhibit the release of the monitor when the test metric falls below the threshold.

The time constant of this additional hold depends on the expectable multipath characteristics. For safety critical application it is defined such that the satellite will be re-included to the position solution after the longest possible time constant of a multipath oscillation for the shortest possible object distance.

A conservative approach is to exclude the satellite for the duration of a pass. A re-inclusion would only occur, once the satellite rises again after it has settled.

Extension of the Satellite Vs. Receiver Exclusion Decision

In the case of more than two receivers being used for the position determination also more gradual monitor actions, compared to simple satellite/receiver exclusion, can be performed.

Multiple receivers may be used in position determination to reduce noise and uncorrelated errors.

This is typically achieved by averaging the information over the receivers and satellites used for the position determination.

In such a scenario multipath errors which are correlated between the receivers or satellites are extremely critical, since correlated errors cannot be removed through averaging.

With two receivers the degree of commonality of the multipath errors between two receivers can be assessed by the co-variance or bi-variate correlation of the correlator measurements:

$$\text{cov}_{1,2} = \text{cov}(TM_{MP1}, TM_{MP2}) = \quad \text{Eq. 16}$$

$$\frac{1}{m-1} \sum_{l=1}^{m} (CDV_{l,1} - \mu_{CDVl,1})(CDV_{l,2} - \mu_{CDVl,2})$$

$$c_{1,2} = \text{corr}(TM_{MP1}, TM_{MP2}) =$$

$$\frac{\frac{1}{m-1} \sum_{l=1}^{m} (CDV_{l,1} - \mu_{CDVl,1})(CDV_{l,2} - \mu_{CDVl,2})}{\sigma_{CDV1} \cdot \sigma_{CDV2}}$$

The mean $\mu_{CDV}$ is normal fault free conditions zero.

When the pre-configured values from configuration phase are taken, the correlation will exceed the range interval of $[-1; 1]$.

The determination of the co-variance between the receivers allows for direct assessment of correlation effects between the two receivers (what is the equivalent to the use of canonical correlations).

The assessment of covariance based metrics with the open interval $(-\inf; \inf)$ is advantageous over correlation (closed interval $[-1; 1]$) based assessment when a direct assessment of the common error is to be performed. In cases where the degree of commonality of the error is to be assessed, the correlation will be used, as it is equivalent to the percentage of the common error in the overall error.

If the cov or corr exceeds a predefined value, depending on the maximum allowable degree of correlation between two measurements, the according receiver or satellite pair will be removed from the position determination. The allowable degree of correlation can be determined based on the allowable degree of common error in the (averaged) position determination. The correlation describes the degree of common error variance.

In addition a direct determination of the size of the inter-receiver-correlated errors can be performed for systems with multiple GNSS reference antennas. This avoids the drawback of only pairwise assessments.

This process can be expanded for combined assessment of the effect from multiple receivers on a single receiver.

The correlation of all receivers $1 \ldots i$; $i \neq o$ or satellites $1 \ldots j$; $j \neq p$ onto one specific receiver $o$ or satellite $p$ can be determined as follows (again closed interval or open interval based assessments are feasible, below given equations cover the correlation based assessment. The covariance based assessment works in the same manner. The only difference is the use of cov instead of corr.).

The multiple correlation is given as:

$$C_{o,i1\ldots i} = \sqrt{\sum_{r=1}^{i} \beta_i c_{io}} \quad \text{Eq. 17}$$

with the beta-weights $$\beta_{i,o} = C_i^{-1} c_{io} \quad \text{Eq. 18}$$

and the matrice of intercorrelations of the predictors using the bi-variate correlations as given in Eq. 16:

$$C_i = \begin{bmatrix} 1 & c_{1,2} & \ldots & c_{1,i} \\ c_{2,1} & 1 & \ldots & c_{2,i} \\ \vdots & \vdots & \ddots & \vdots \\ c_{o,1} & c_{o,2} & \ldots & 1 \end{bmatrix} \quad \text{Eq. 19}$$

and $$c_1 = \begin{bmatrix} c_{12} \\ c_{13} \\ \vdots \\ c_{1o} \end{bmatrix}; c_2 = \begin{bmatrix} c_{12} \\ c_{23} \\ \vdots \\ c_{2o} \end{bmatrix}; \ldots ; c_o = \begin{bmatrix} c_{1o} \\ c_{2o} \\ \vdots \\ c_{io} \end{bmatrix} \quad \text{Eq. 20}$$

with the number of reference receivers i the number of intercorrelations of predictor variables is k=i −1. The intercorrelations of the predictor variables are the interreceiver correlations of those receivers which represent the predictors in i for the receiver representing the criteria variable o.

The receiver intercorrelations are calculated in accordance with Eq. 16 for all receiver combinations.

The determination of the beta-weights is thus achieved by solving a linear equation system:

$$c_{io} = C_i \beta_{i,o} \quad \text{Eq. 21}$$

That is to solve:

$$\beta_{i,o} = (C_i^T C_i)^{-1} C_i c_{io} \quad \text{Eq. 22}$$

A discriminator $C_{o,1\ldots,i}$, describing the degree of the commonality of the error from all receivers, 1 . . . i, onto one specific, o, can be calculated:

$$C_{1,1\ldots i;1_o} = \sqrt{C_{1,2\ldots i}\beta_1} = \sqrt{[c_{1,2} \ldots c_{1,i}]\begin{bmatrix} \beta_{1,1} \\ \vdots \\ \beta_{1,o} \end{bmatrix}} \quad \text{Eq. 23}$$

$$\vdots$$

$$C_{o,1\ldots i;1_o} = \sqrt{C_{o,2\ldots i,i\neq o}\beta_{o,o\neq 1}} = \sqrt{[c_{o,2} \ldots c_{o,i}]\begin{bmatrix} \beta_{o,1} \\ \vdots \\ \beta_{o,o} \end{bmatrix}}$$

Example for I=3:

$$C_i = \begin{bmatrix} C_1 \\ C_2 \\ C_3 \end{bmatrix} = \begin{bmatrix} \begin{bmatrix} 1 & c_{23} \\ c_{23} & 1 \end{bmatrix} \\ \begin{bmatrix} 1 & c_{13} \\ c_{13} & 1 \end{bmatrix} \\ \begin{bmatrix} 1 & c_{12} \\ c_{12} & 1 \end{bmatrix} \\ \begin{bmatrix} 1 & c_{12} \\ c_{12} & 1 \end{bmatrix} \end{bmatrix} \quad \text{Eq. 24}$$

$$c_i = [c1 \; c2 \; c3] = \begin{bmatrix} \begin{bmatrix} c_{12} \\ c_{13} \end{bmatrix} & \begin{bmatrix} c_{13} \\ c_{23} \end{bmatrix} & \begin{bmatrix} c_{14} \\ c_{24} \end{bmatrix} \end{bmatrix} \quad \text{Eq. 25}$$

$$\beta_1 = \frac{(1-c_{23}^2)c_{1o} + (c_{12}c_{23} - c_{12})c_{2o} + (c_{12}c_{23} - c_{13})c_{3o}}{1 + 2(c_{12}c_{13}c_{23}) - (c_{12}^2 + c_{13}^2 + c_{23}^2)} \quad \text{Eq. 26}$$

$$\beta_2 = \frac{(c_{13}c_{23} - c_{12})c_{1o} + (1-c_{13}^2)c_{2o} + (c_{12}c_{13} - c_{23})c_{3o}}{1 + 2(c_{12}c_{13}c_{23}) - (c_{12}^2 + c_{13}^2 + c_{23}^2)}$$

$$\beta_3 = \frac{(c_{12}c_{23} - c_{13})c_{1o} + (c_{12}c_{13} - c_{23})c_{2o} + (1-c_{12}^2)c_{3o}}{1 + 2(c_{12}c_{13}c_{23}) - (c_{12}^2 + c_{13}^2 + c_{23}^2)}$$

$C_{o,1\ldots I}$ can vary inside the interval [0; 1]. If the entire error of receiver "o" can be explained by the errors from receivers 1 . . . i (fully correlated) the value of $C_{o,1\ldots I}$ will be "1". $C_{o,1\ldots I}$ is proportional to the percentage of common error variance.

Example: in case of five receivers, where the errors between receivers 1, 2 and 3 are correlated, while the errors at receivers 4 and 5 are fully uncorrelated, the values of $C_{1\_2,3,4,5}$, $C_{2,1,3,4,5}$, $C_{3\_1,2,4,5}$ will be different from zero and proportional to the common error, while $C_{4\_1,2,3,5}$ and $C_{5\_1,2,3,4}$ are close to zero, indicating that their error is fully uncorrelated and thus noise-like and can be considered as operating normally.

With five receivers 10 bi-variate correlations will result and it is complex to identify those who work in a normal manner (the number of bi-variate correlation increases with ($i^2-i$)/2). Moreover, all bi-variate correlations of a receiver working normally and a receiver affected by the (common) multipath will potentially not be detected due to reduction in the value of the correlation.

The multiple discriminator will directly show which receivers are affected by the common multipath error and which receivers are not. The number of multiple discriminators in a system consisting of I receivers is always i, what simplifies the monitor decision in case of systems with multiple receivers.

The multiple discriminator can also be used to increase the confidence whether an error condition is local to the receiver or is due to a satellite fault. In case of a satellite fault all $TM_{MP,I}$ will be increased, the error is fully correlated and all multiple discriminators will deviate from zero and be larger than the maximum allowable level of common errors.

Then for satellite j:

$$\frac{1}{o}\sum_{n=1}^{o}(C_{n,1\ldots i;i\neq n}(j)) > C_{max} > 0 \quad \text{Eq. 27}$$

and the satellite j will be excluded from the position determination.

If the error is local to one or some receivers, then $$\frac{1}{o}\sum_{n=1}^{o}(C_{n,1\ldots i;i\neq n}(j)) < C_{max} > 0 \quad \text{Eq. 28}$$

and $$C_{k,1\ldots i;i\neq n}(j) > C_{max}$$

where k is the index of the receiver(s) affected by the local error.

In addition with systems using hot spare receivers (i+q) a selection of a receiver subset (i) with minimal errors can be performed in realtime based on above given correlation/covariance assessment. The subset with the minimal average multiple correlation $\min(\mu(C_{o,i}))$ is then chosen from all $\mu(C_{o,i+q})$.

Mean for Ref. Antenna Deselection

With systems providing differential corrections to GNSS satellites a mean at the ground equipment to remove a single antenna from calculation of the averaged correction information (pseudo-range correction PRC & range rate correction RRC) or position calculation as well as from common clock determination may be provided.

Such a mean can be a hardware (HW) switch or a software (SW) mean like button in a graphical user interface.

As a reaction, the respective antenna is excluded from calculation of correction information and the clock determination.

The activation of the de-selection may be annunciated by visual means (like a LED).

The operational mode is adapted depending on the number of installed GNSS reference antennas. Examples:

1. In case of aeronautical GBAS operation with three ground reference antennas in support of CAT III operations with deselection of one antenna the mode will be adapted from active CAT III support to CAT I (or II) support.

2. In case of train operation with full supervised mode with the deselection of an antenna the active mode is reduced to a degraded mode such as staff responsible mode.

No activation of the maintenance mode (incl. shutdown of the GBAS data broadcast) is performed.

Annunciation to ATC operator or driver is only performed in case of degradation of the mode, so that it is feasible to continue normal operation if hot spare reference antennas are available.

Without hot spare antennas the noise in the system will slightly increase and the correction information will be slightly noisier what normally reduces the continuity. However, with sufficiently high nominal ground performance even after de-selection of one antenna the remaining number of active reference antennas is high enough to achieve the required performance (only redundancy is affected).

Figure 14A:
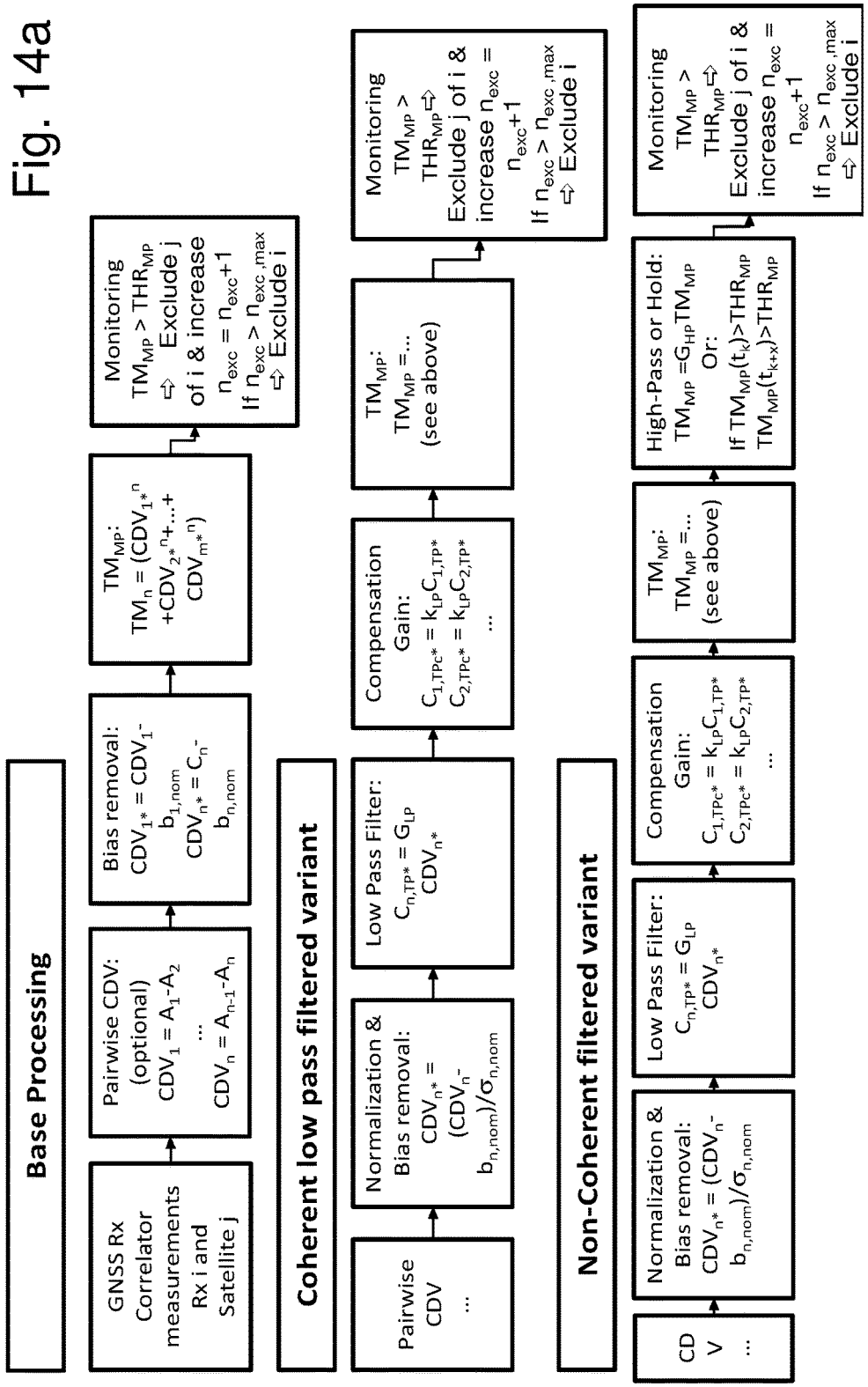
FIG. 14a-14b shows a schematic illustration of the inventive monitor processing overview by way of example.
Figure 14B:
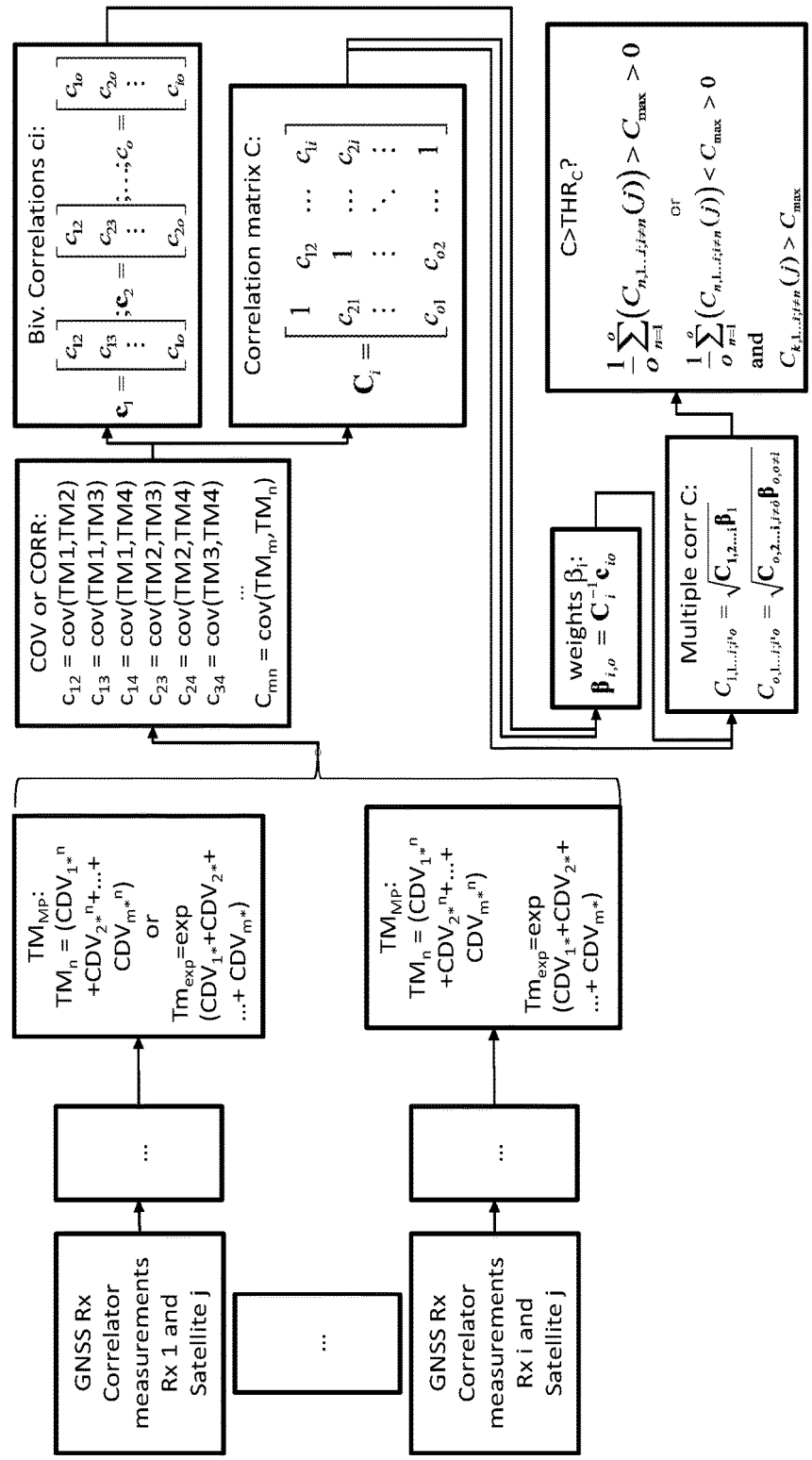

FIG. 14a and FIG. 14b show an overview over the inventive monitor processing, by way of example.

What is claimed is:

1. A method for operating a GNSS (Global Navigation Satellite System) receiver, the method comprising the steps of:
    receiving, from a multitude of satellites, a respective GNSS code signal to the GNSS receiver for a position determination;
    correlating the received GNSS code signal for each signal from a satellite of the multitude of satellites with a reference code signal generated by the GNSS receiver to obtain an autocorrelation function;
    analyzing and using a multitude of function values of the autocorrelation function at different discrete chip spacings to obtaining a test metric;
    making a decision using said test metric whether the received GNSS code signal is suitable for a position determination or unsuitable for a position determination due to multipath signal components;
    making a position determination of the GNSS receiver based on the received GNSS code signals from the multitude of satellites, with received GNSS code signals considered unsuitable for position determination being excluded from the position determination;
    choosing asymmetrically with respect to a prompt chip spacing the chip spacings of the multitude of function values of the autocorrelation function;
    performing a bias removal during analysis of the multitude of function values of the autocorrelation function taking into account corresponding function values of an autocorrelation function that would result from a received GNSS code signal of the satellite unaffected by multipath signal components; and
    wherein the multitude of function values contribute to the test metric in an order higher than first order.

2. The method according to claim 1, wherein the prompt chip spacing is chosen at the maximum of the autocorrelation function.

3. The method according to claim 1, wherein the chip spacings of the multitude of function values of the autocorrelation function are chosen predominantly on the late side with respect to the prompt chip spacing.

4. The method according to claim 1, wherein at least 3, 6 or 8 functional values contribute to the test metric.

5. The method according to claim 1, wherein during analysis of the functional values, pairwise differences of functional values with successive chip spacings are calculated, and these differences are used to calculate the test metric.

6. The method according to claim 1, wherein the bias removal encompasses a normalization and/or variance scaling.

7. The method according to claim 1, wherein the functional values contribute to the test metric in second order, in higher than second order or exponentially.

8. The method according to claim 1, wherein in said decision the test metric is used such that in case the test metric is larger than a critical value, the received GNSS code signal is considered unsuitable for position determination.

9. The method according to claim 1, wherein position determinations are done repeatedly, wherein carrier waves carrying the GNSS code signals undergo a low pass filtering, and wherein in case a received GNSS code signal of a satellite has been found unsuitable for position determination using the test metric, a number of subsequent received GNSS code signals of the same satellite will be considered as unsuitable for position determination, too, regardless of obtained test metrics for these subsequent GNSS code signals.

10. The method according to claim 1, wherein position determinations are done repeatedly, wherein carrier waves carrying the GNSS code signals undergo a low pass filtering, and wherein said low pass filtering is reproduced in the test metric.

11. The method according to claim 1, wherein a number N of GNSS receivers are operated simultaneously, with N≥2, wherein the different GNSS receivers receive GNSS code signals from a number J of satellites, with J≥2, and wherein the decision whether a particular GNSS code signal from a particular satellite received at a particular GNSS receiver is suitable for a position determination or unsuitable for a position determination due to multipath signal components is not only depending on the test metric of this particular GNSS code signal, but also depending on the test metrics of GNSS code signals received by the other GNSS receivers and/or from the other satellites.

12. The method according to claim 11, wherein in case covariance of test metrics from different GNSS receivers belonging to received GNSS code signals from the same satellite exceeds a threshold, all received GNSS code signals from that satellite are considered unsuitable for position determination.

13. The method according to claim 11, wherein in case covariance of test metrics from the same GNSS receiver belonging to GNSS code signals from different satellites exceeds a threshold, all received GNSS code signals at that GNSS receiver are considered unsuitable for position determination.

14. The method according to claim 11, wherein in case for a particular GNSS receiver, a critical fraction of received GNSS code signals is considered unsuitable due to the test metric of the respective received GNSS code signal in each case, then all GNSS code signals received at the particular GNSS receiver are considered unsuitable for position determination.

15. The method according to claim 11, wherein in case for a particular satellite, a critical fraction of GNSS code signals from the particular satellite received at different GNSS receivers is considered unsuitable due to the test metric of the respective received GNSS code signal in each case, then all GNSS code signals from that satellite are considered unsuitable for position determination.

16. The method according to claim 1, wherein one or a plurality of GNSS receivers is placed on a running train.

17. A GNSS receiver or a set of GNSS receivers, adapted for performing a method according to claim 1.

* * * * *